US012068639B2

(12) United States Patent
Lu et al.

(10) Patent No.: US 12,068,639 B2
(45) Date of Patent: Aug. 20, 2024

(54) MOTOR ROTOR WITH SLEEVE FOR RETENTION OF MAGNET RING

(71) Applicant: Black & Decker Inc., New Britain, CT (US)

(72) Inventors: Changxing Lu, Suzhou (CN); Abraham Sanchez, Lutherville-Timonium, MD (US); Tong Zheng, Suzhou (CN); Fulong Liu, Suzhou (CN); Yeli Gu, Suzhou (CN); David J. Smith, Columbia, MD (US); Shailesh P. Waikar, Perry Hall, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/832,315

(22) Filed: Jun. 3, 2022

(65) Prior Publication Data

US 2022/0393534 A1 Dec. 8, 2022

Related U.S. Application Data

(60) Provisional application No. 63/197,680, filed on Jun. 7, 2021.

(51) Int. Cl.
*H02K 1/30* (2006.01)
*H02K 1/2733* (2022.01)
(Continued)

(52) U.S. Cl.
CPC .............. *H02K 1/30* (2013.01); *H02K 1/2733* (2013.01); *H02K 7/145* (2013.01); *H02K 15/03* (2013.01); *H02K 29/00* (2013.01)

(58) Field of Classification Search
CPC .......... H02K 1/2733; H02K 1/30; H02K 9/06; H02K 15/03; H02K 29/00; H02K 7/145
(Continued)

(56) References Cited

U.S. PATENT DOCUMENTS

| 4,954,736 A | 9/1990 | Kawamoto et al. |
| 6,552,459 B2 | 4/2003 | Burton |

(Continued)

FOREIGN PATENT DOCUMENTS

| DE | 102011105867 A1 | 12/2012 |
| DE | 102016108841 A1 | 11/2016 |

(Continued)

OTHER PUBLICATIONS

EP EESR, dated Feb. 20, 2023, in corresponding EP application No. 22177384.9.

(Continued)

*Primary Examiner* — Jose A Gonzalez Quinones
(74) *Attorney, Agent, or Firm* — Amir R. Rohani

(57) ABSTRACT

A brushless direct-current (BLDC) motor is provided. The motor includes a stator including a stator core, stator teeth, and windings; a rotor shaft disposed within the stator and extending along a longitudinal axis; and a rotor. The rotor includes a rotor core having a cylindrical body, a permanent magnet ring mounted on an outer surface of the cylindrical body with no intermediate adhesive therebetween, and metal sleeve securely fitted outside the permanent magnet ring. The metal sleeve includes a flange extending radially inwardly that covers an axial end of the permanent magnet ring and is bonded to the rotor core to secure the permanent magnet ring to the rotor core.

8 Claims, 29 Drawing Sheets

(51) Int. Cl.
   *H02K 7/14* (2006.01)
   *H02K 15/03* (2006.01)
   *H02K 29/00* (2006.01)

(58) Field of Classification Search
   USPC .................. 310/50, 156.28, 156.29, 156.31
   See application file for complete search history.

(56) References Cited

U.S. PATENT DOCUMENTS

| | | | |
|---|---|---|---|
| 7,372,181 | B2 | 5/2008 | Kinashi et al. |
| 7,394,174 | B2 | 7/2008 | Blase et al. |
| 7,423,357 | B2 | 9/2008 | Takahashi et al. |
| 7,687,957 | B2 | 3/2010 | Ochiai |
| 8,040,015 | B2 | 10/2011 | Zaps |
| 8,552,601 | B2 | 10/2013 | Mizukami et al. |
| 9,570,949 | B2 | 2/2017 | Kamiya et al. |
| 11,642,772 | B2 | 5/2023 | Nakashima |
| 2011/0089781 | A1 | 4/2011 | Yoneyama |
| 2015/0180307 | A1* | 6/2015 | Inuzuka .............. B25F 5/008 310/50 |
| 2016/0043620 | A1 | 2/2016 | Li et al. |
| 2016/0149461 | A1 | 5/2016 | Kono et al. |
| 2017/0288499 | A1 | 10/2017 | Milwaukee |
| 2018/0006514 | A1 | 1/2018 | Choi et al. |
| 2021/0159744 | A1 | 5/2021 | Sugimoto |

FOREIGN PATENT DOCUMENTS

| | | | |
|---|---|---|---|
| DE | 112015000605 T5 | | 11/2016 |
| DE | 102017114230 A1 | | 12/2017 |
| JP | 06245418 A | * | 9/1994 |
| JP | 2004194480 A | * | 7/2004 |
| JP | 2006050816 A | * | 2/2006 |
| JP | 2006087276 A | * | 3/2006 |
| JP | 2012070585 A | | 4/2012 |
| JP | 2020089005 A | * | 6/2020 |
| WO | 2011159674 A1 | | 12/2011 |
| WO | 2020089005 A | * | 6/2020 |
| WO | WO-2020158083 A1 | * | 8/2020 ........... H02K 1/2733 |

OTHER PUBLICATIONS

EP EESR, dated Feb. 8, 2023, in corresponding EP application No. 22177386.4.
EP EESR dated, Nov. 3, 2022 in corresponding EP application No. 22177384.9.
EP EESR dated, Nov. 8, 2022 in corresponding EP application No. 22177386.4.

* cited by examiner

MOTOR ROTOR WITH SLEEVE FOR RETENTION OF MAGNET RING

RELATED APPLICATION

This utility patent application claims the benefit of U.S. Provisional Patent Application No. 63/197,680, filed Jun. 7, 2021, which is incorporated herein by reference in its entirety.

FIELD

This disclosure relates to a brushless motor, particularly a motor having a sleeve for retention of the a rotor magnet ring.

BACKGROUND

Power tools such as impact drivers and impact wrenches may be used for driving threaded fasteners into workpieces. Such power tools may lack sufficient power to drive a threaded fastener into a workpiece or may be too large in length or girth to fit into a desired location. In such power tools, it is desirable to reduce the girth and/or length of the tool, including the motor assembly and related components, without sacrifice power performance.

Brushless direct-current motors have been used in power tools over the past two decades. Motor designers often strive to reduce the size of the motor, including its components. While conventional motors include rotors with embedded permanent magnets, reduction in size of the rotor requires innovative design features for placement and retention of permanent magnets to the outer surface of the rotor.

SUMMARY

According to an aspect of the invention, a brushless direct-current (BLDC) motor is provided. The motor includes a stator including a stator core, stator teeth, and windings; a rotor shaft disposed within the stator and extending along a longitudinal axis; and a rotor including a rotor core having a cylindrical body, a permanent magnet ring mounted on an outer surface of the cylindrical body with no intermediate adhesive therebetween, and metal sleeve securely fitted outside the permanent magnet ring. In an embodiment, the metal sleeve includes a flange extending radially inwardly that covers an axial end of the permanent magnet ring and is bonded to the rotor core to secure the permanent magnet ring to the rotor core.

In an embodiment, the flange is bonded to the rotor core via welding or soldering.

In an embodiment, the metal sleeve is press-fitted or friction-fitted on the permanent magnet ring.

In an embodiment, the rotor core includes a radial wall extending from a central opening to the cylindrical body, the cylindrical body defining an annular recess therein adjacent the radial wall, and the flange is bonded to the radial wall.

In an embodiment, the metal sleeve is mounted on a first end of the rotor core. The motor further includes a second metal sleeve mounted on a second end of the rotor core opposite the metal sleeve.

In an embodiment, a length of the metal sleeve is less than half a length of the permanent magnet ring, and a length of the second metal sleeve is less than half the length of the permanent magnet ring.

In an embodiment, the sleeve further includes a plurality of teeth located opposite the flange and folded radially inwardly to engage a second axial end of the permanent magnet ring.

In an embodiment, the teeth are bonded to the rotor core via welding or soldering.

According to an aspect of the invention, a brushless direct-current (BLDC) motor is provided. The motor includes a stator including a stator core, stator teeth, and windings; a rotor shaft disposed within the stator and extending along a longitudinal axis; and a rotor. The rotor includes a rotor core having a cylindrical body, a permanent magnet ring mounted on an outer surface of the cylindrical body, and a metal sleeve including a cylindrical portion mounted on the permanent magnet ring. The sleeve further includes a flange extending radially inwardly from a first end of the cylindrical portion that covers a first axial end of the permanent magnet ring and engages a first axial end of the rotor core, and a plurality of teeth extending from a second end of the cylindrical portion and folded radially inwardly to cover a second axial end of the permanent magnet ring and engage a second axial end of the rotor core.

In an embodiment, the flange is bonded to the rotor core via welding or soldering.

In an embodiment, the metal sleeve is press-fitted or friction-fitted on the permanent magnet ring.

In an embodiment, the rotor core comprises a radial wall extending from a central opening to the cylindrical body, the cylindrical body defining an annular recess therein adjacent the radial wall, wherein the flange is bonded to the radial wall.

In an embodiment, the plurality of teeth is bonded to the rotor core via welding or soldering.

In an embodiment, a power tool is provided including a housing; a trigger switch mounted on the housing; a battery receptacle located on the housing and configured to receive a removeable battery pack; and a BLDC motor as described above disposed within the housing and configured to receive power from the battery pack.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. It is to be understood that both the foregoing general description and the following detailed description are exemplary and explanatory only and are intended to provide an explanation of various embodiments of the present teachings.

Figure 1:
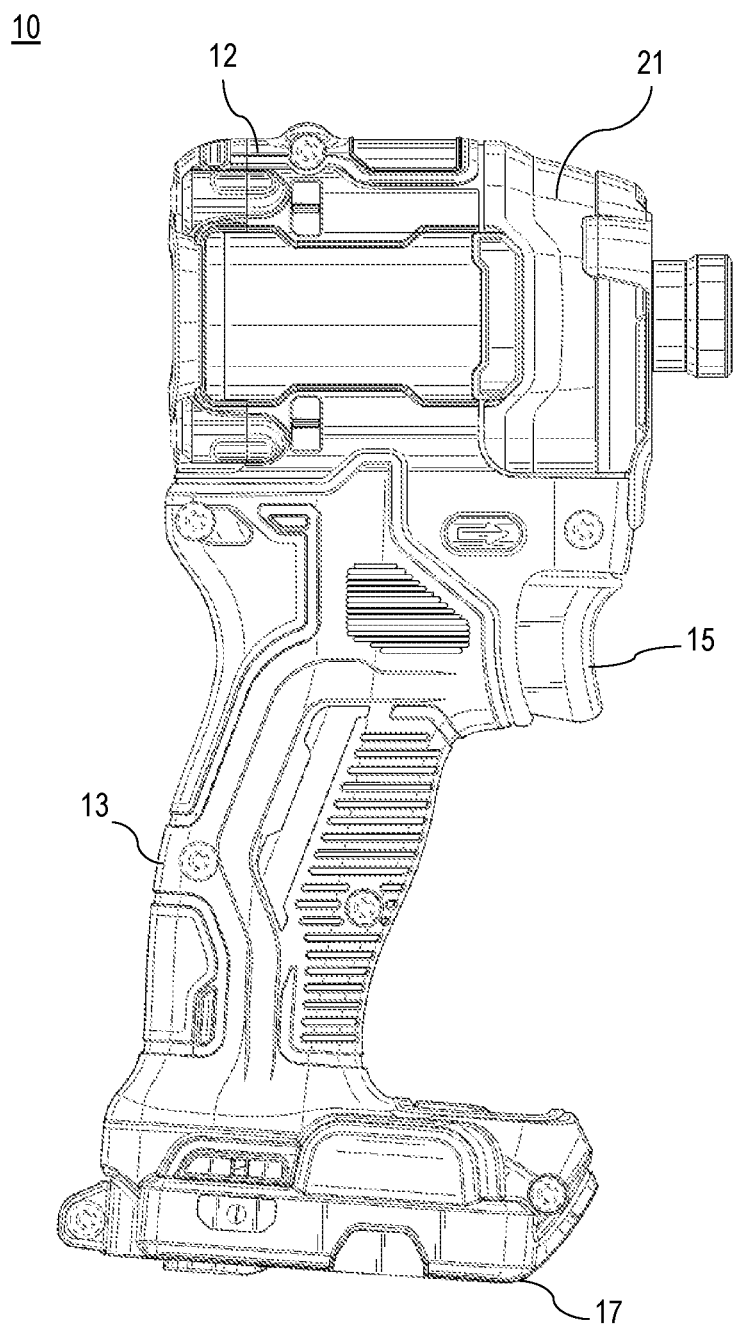
FIG. 1 depicts a side view of a first embodiment of a power tool, in this example an impact tool, according to an embodiment.
Figure 2A:
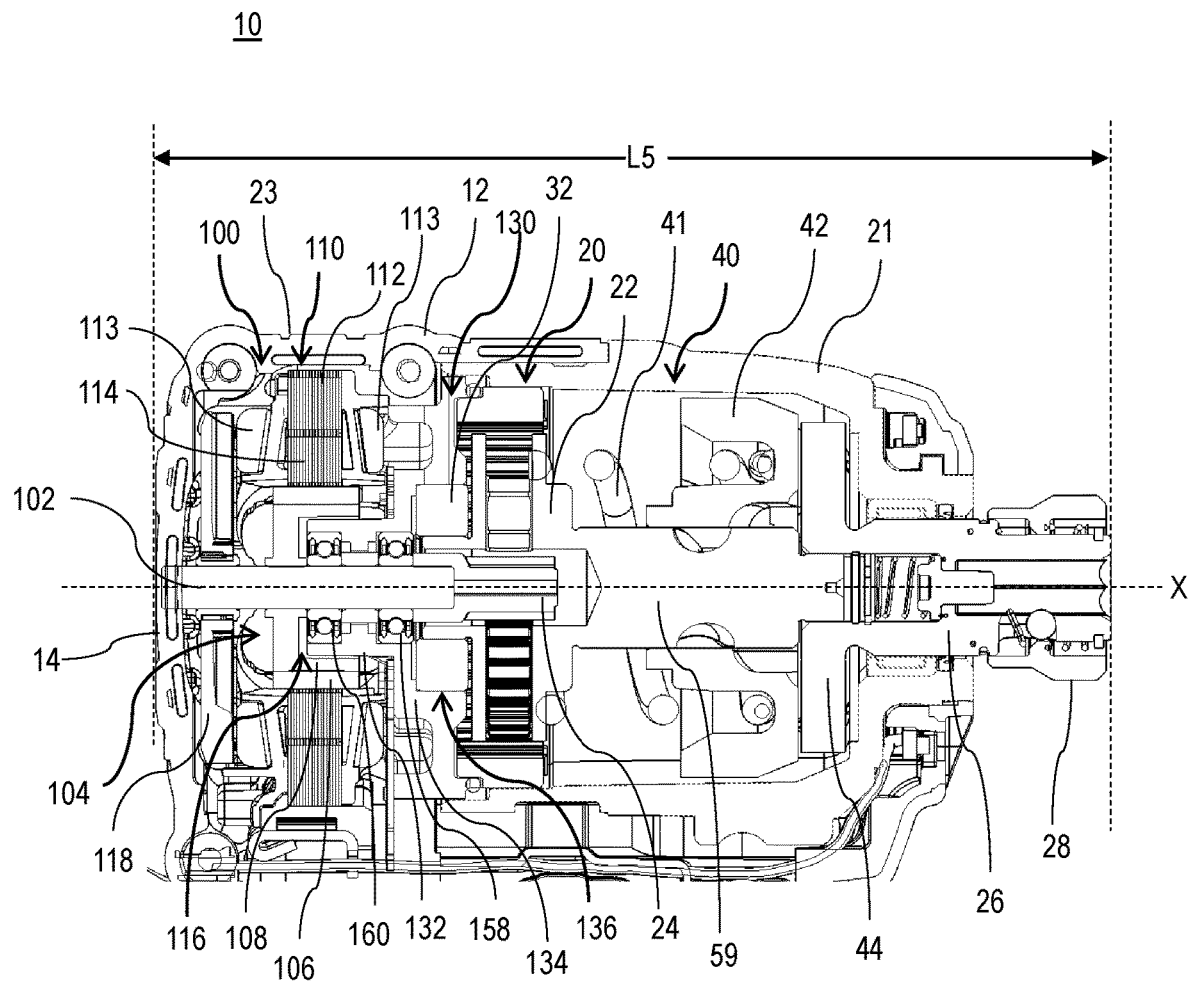
FIG. 2A depicts a partial cross-sectional view of an exemplary impact tool according to an embodiment.
Figure 2B:
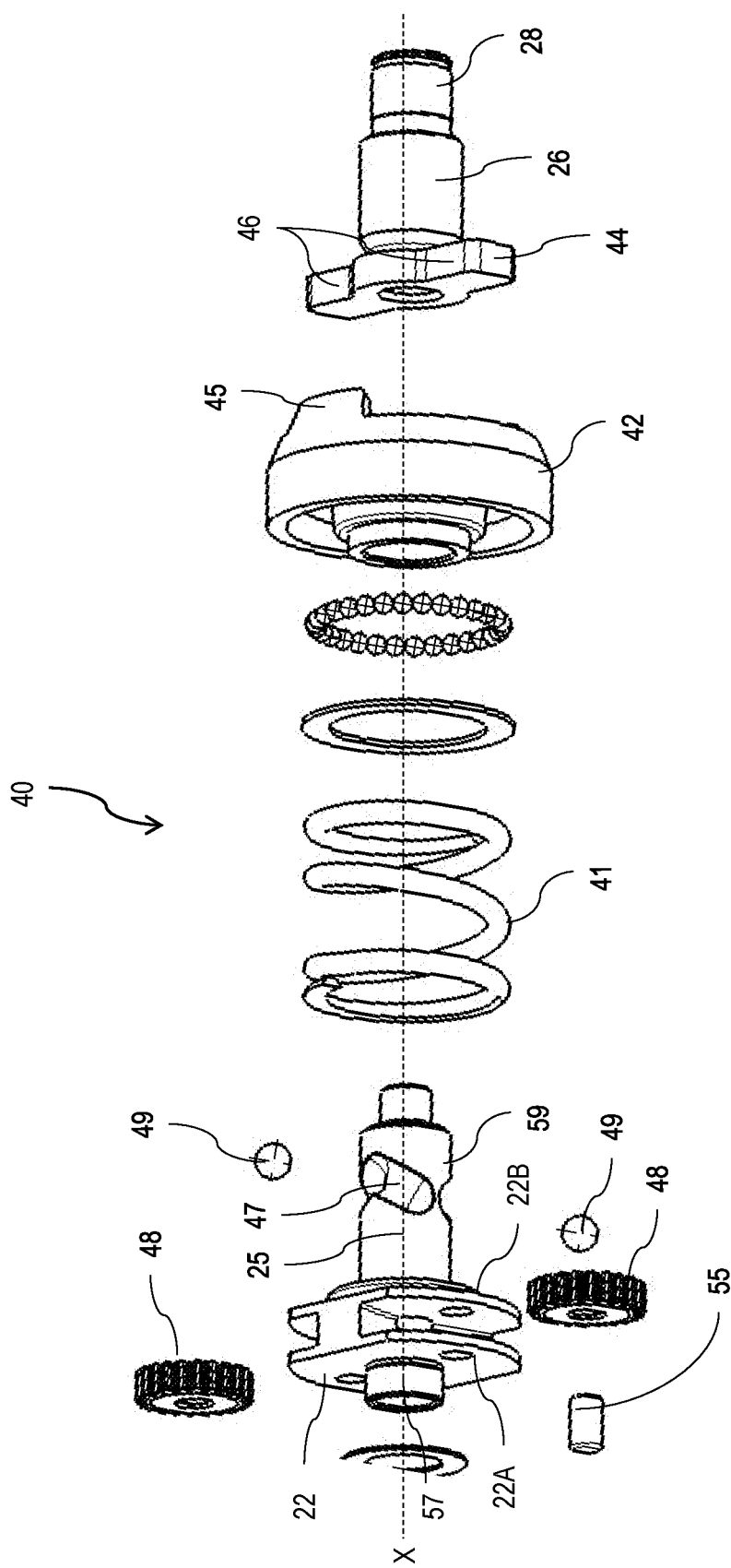
FIG. 2B depicts an exploded view of an impact mechanism of an exemplary impact tool according to an embodiment.
Figure 3:
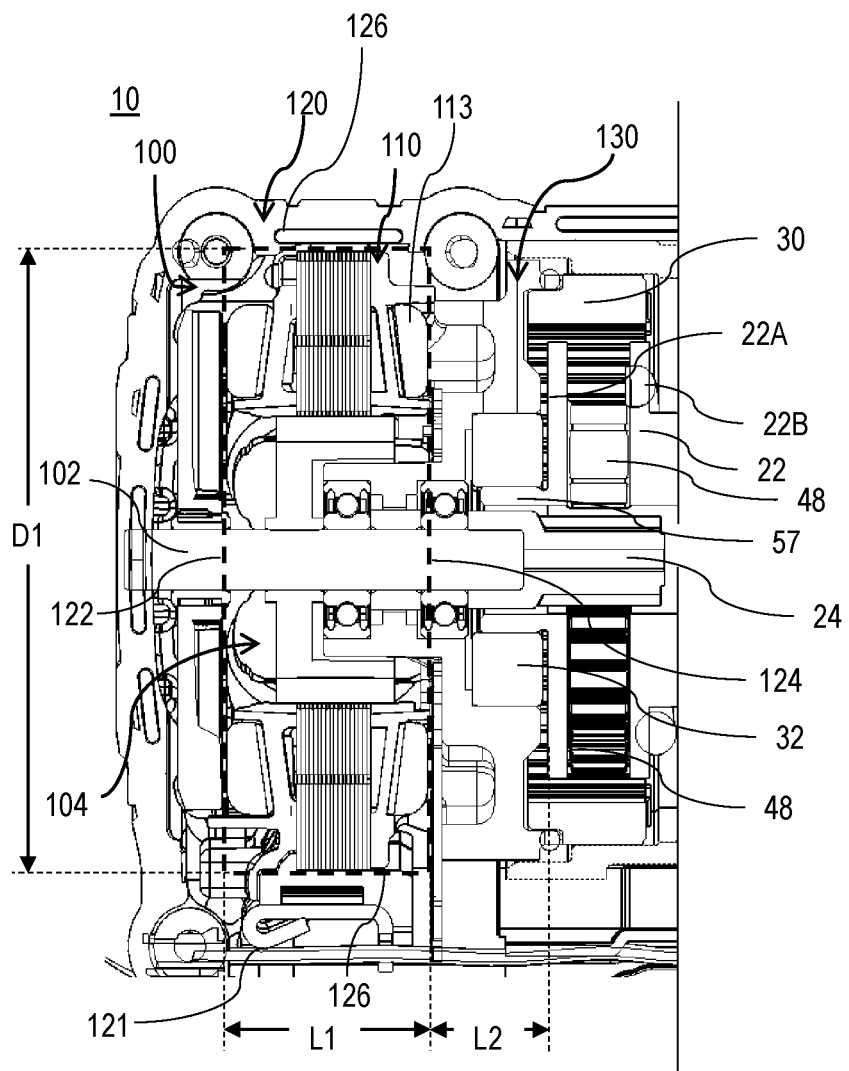
FIG. 3 depicts a zoomed-in partial cross-sectional view of an exemplary power tool, according to an embodiment.

FIG. 1 depicts a side view of a power tool 10, in this example an impact tool, according to an embodiment. FIG. 2A depicts a partial cross-sectional view of the exemplary impact tool 10 according to an embodiment. FIG. 2B depicts an exploded view of the exemplary impact tool 10 according to an embodiment. FIG. 3 depicts a zoomed-in partial cross-sectional view of the exemplary power tool 10, according to an embodiment.

In an embodiment, the exemplary impact tool 10 includes a housing 12 having a motor housing portion 23 including two clamshells that come together to house a motor 100 rotatably driving a rotor shaft 102 and a transmission housing portion 21 coupled to the motor housing portion 23 that houses a transmission assembly 20 and an impact mechanism 40 that together selectively impart rotary motion and/or a rotary impact motion to an output spindle 26. Coupled to the output spindle 26 is a tool holder 28 for retaining a tool bit (e.g., a drill bit, a screw driving bit, or a socket wrench, not shown). Further details regarding exemplary tool holders are set forth in U.S. patent application Ser. No. 12/394,426, which is incorporated herein by reference. The power tool further includes a handle 13 that extends transverse to the housing 12 and accommodates a trigger switch 15, a control and/or power module (not shown) that includes control electronics and switching components for driving the motor 100, and a battery receptacle 17 that receives a removeable power tool battery pack for supplying electric power to the motor 100. The handle 13 has a proximal portion coupled to the housing 12 and a distal portion coupled to the battery receptacle 17. The motor 100 may be powered by an electrical power source, such as a DC power source or battery (not shown), that is coupled to the battery receptacle 17, or by an AC power source. The trigger 15 is coupled to the handle 13 adjacent the housing 12. The trigger 15 connects the electrical power source to the motor 100 via the control and/or power module, which controls power delivery to the motor 100.

In an embodiment, the transmission assembly 20 may comprise a planetary transmission and may include, among other features, a pinion or sun gear 24 that is coupled to an end of the rotor shaft 102 of the motor 100 and that extends along a tool axis X. One or more planet gears 48 surround and have teeth that mesh with the teeth on the sun gear 24. An outer ring gear 30 is rotationally fixed to the housing 12 and centered on the tool axis X with internal teeth meshing with the teeth on the planet gears 48. A cam carrier 22 includes a pair of carrier plates 22A, 22B that support the planet gears 48 with pins 55 so that the planet gears 48 can rotate about the pins 55. The cam carrier 52 further includes a rearward protrusion 57 that extends axially rearward from the rear carrier plate 22A along the axis X and a cam shaft 59 that extends axially forward from the front carrier plate 22B along the axis X.

When the motor 100 is energized, the rotor shaft 102 and the sun gear 24 rotate about the axis X. Rotation of the sun gear 24 causes the planet gears 48 to orbit the sun gear 24 about the axis X, which in turn causes the cam carrier 22 to rotate about the axis X at a reduced speed relative to the rotational speed of the rotor shaft 102. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission or a spur gear transmission.

The impact mechanism 40 includes the cam shaft 59, a generally cylindrical hammer 42 received over the cam shaft 59, and an anvil 44 fixedly coupled to the output spindle 26. The hammer 42 has two lugs 45 configured to engage two radial projections 46 on the anvil 44 in a rotating direction. Formed on an outer surface of the cam shaft 59 is a pair of rear-facing V-shaped cam grooves 47 with their open ends facing toward transmission assembly 20. A corresponding pair of forward-facing V-shaped cam grooves (not shown) is formed on an interior surface of the hammer 42 with their open ends facing toward the output spindle 26. Balls 49 are received in and rides along each of the cam grooves 47 to movably couple the hammer 42 to the cam shaft 59. A compression spring 41 is received in a cylindrical recess in the hammer 42 and abuts a forward face of the front carrier plate 22B. The spring 41 biases the hammer 42 toward the anvil 44 so that the so hammer lugs 45 engage the corresponding anvil projections 44.

At low torque levels, the impact mechanism 40 transmits torque from the transmission assembly 20 to the output spindle 26 in a rotary mode. In the rotary mode, the compression spring 41 maintains the hammer 42 in a forward position so that the hammer lugs 45 continuously engage the anvil projections 46. This causes the cam shaft 59, the hammer 42, the anvil 44, and the output spindle 26 to rotate together as a unit about the axis X. As torque increases, the impact mechanism 40 may transition to transmitting torque to the output spindle 26 in an impact mode. In the impact mode, the hammer 44 moves axially rearwardly against the force of the spring 41, decoupling the hammer lugs 45 from the anvil projections 46. The anvil 44 continues to spin freely on about the axis X without being driven by the motor assembly 100 and the transmission assembly 20, so that the anvil 44 coasts to a slower speed. Meanwhile, the hammer 42 continues to be driven at a higher speed by the motor assembly 100 and transmission assembly 20, while the hammer 42 moves axially rearwardly relative to the anvil 44 by the movement of the balls 49 in the V-shaped cam grooves 47. When the balls 49 reach their rearmost position in the V-shaped cam grooves 47, the spring 41 drives the hammer 42 axially forward with a rotational speed that exceeds the rotational speed of the anvil 44. This causes the hammer lugs 45 to rotationally strike the anvil projections 46, imparting a rotational impact to the output spindle 26.

In an embodiment, the motor 100 is a brushless direct-current (BLDC) motor that includes an inner rotor 104 having surface-mount magnets 106 on a rotor core 108 and a stator assembly 110 located around the rotor 104. The stator assembly 110 includes a stator core 112 having a series of teeth 114 projecting radially inwardly from the stator core 112, and a series of conductive windings 113 wound around the stator teeth 114 to define three phases connected in a wye or a delta configuration. As the phases of the stator assembly 110 are sequentially energized, they interact with the rotor magnets 106 to cause rotation of the rotor 104 relative to the stator assembly 110.

In an embodiment, the rotor core 108 is mounted on the rotor shaft 102 and includes an annular recess 116 around the rotor shaft 102 on one side of the rotor core 104. Specifically, the rotor 104 is provided with what is referred to in this disclosure as an open-core construction, where the rotor magnet 106 is mounted around the rotor core 112 and the annular recess 116 is provided within the rotor core 112 for positioning of one or more of the rotor bearings. The rotor core 112 may be made of a solid core piece of metal or lamination stack that includes a series of parallel laminations. The annular recess 116 may be carved or stamped out of the rotor core 112, or it may be formed using ring-shaped laminations.

In an embodiment, the rotor magnet 106 is a ring surface-mounted on the outer surface of the rotor core 108 and magnetized in a series of poles, e.g., four poles having a S-N-S-N orientation. Alternatively, rotor magnet 106 may be provided as a series of discrete magnet segments that may be pre-magnetized prior to assembly. The outer surface of the rotor core 108 may be shaped for proper retention of the magnet segments. In yet another embodiment, the rotor magnets 106 may be fully or partially embedded within the rotor core 108.

In an embodiment, a fan 118 is mounted on the rotor shaft 102 behind the motor assembly 100. In an embodiment, a rear tool cap 14 is mounted to the end of the housing 12 to contain the end of the motor 100. The rear tool cap 14 may be provided integrally with the housing 12 or as a separate piece. In an embodiment, the fan 118 is positioned between the motor 100 and the rear tool cap 14. The fan 118 generates airflow through the motor 100 and (preferably) the transmission assembly 20 to cool the components.

In an embodiment, a support plate 130 supports front and rear motor bearings 158 and 160 that support the rotor shaft 102. At least the rear motor bearing 160 is located within the stator assembly 110 and within the annular recess 116 of the rotor core 108 along the axial direction of the motor 100 such that the rear motor bearing 160 intersects a portion of the rotor core 108 along a radial plane. The support plate 130 includes a cylindrical portion 132 that receives the outer races of the motor bearings 158 and 160 and a radial portion 134 that extends radially from the cylindrical portion 132 and includes radial ends supported by the tool housing 12. The stator assembly 110 is also supported by the tool housing 12, thus being axially and radially secure with respect to the support plate 130. In this manner, the support plate 130 axially and radially supports the rotor 104 within the stator assembly 110. In an embodiment, the support plate 130 and the stator assembly 110 may be independently supported by the tool housing 12. In another embodiment, the support plate may be formed integrally as a part of two clamshells that form the tool housing 12. Alternatively, the support plate 130 may be piloted to and retained by the stator assembly 110 directly and independently of the tool housing 12.

In an embodiment, as shown in FIGS. 2A and 3, the support plate 130 also has a front lip 131 that supports a component of the transmission assembly 20, such as supporting the ring gear 30, to inhibit axially and rotational movement of the ring gear 30 relative to the housing 12. In addition, the support plate 130 supports a cam carrier bearing 32 that supports the cam carrier 22 relative to the support plate 130, and therefore relative to the motor 100 and the tool housing 12. The cam carrier bearing 32 is nested within the support plate 130 adjacent the motor 100. Specifically, the support plate 130 is positioned between the motor assembly 100 and transmission assembly 20 and provides support for the motor bearings 158 and 160 on one side and for the cam carrier bearing 32 on the other side. In an embodiment, the support plate 130 includes a recessed portion 136 that includes a larger diameter than the cylindrical portion 134 and is sized to receive the cam carrier bearing 32 therein. The cam carrier bearing 32 is thus located axially forward of the entire motor assembly 100.

At least a portion of the support plate 130 is received within the stator assembly 110 and within the rotor core 108. In this embodiment, the rear cylindrical projection of the support plate that supports the motor bearings 158 and 160 is at least partially received within the stator assembly 110 and within the motor core 108. In this embodiment, the nested arrangement of the one or more motor bearings 158 and 160 and the support plate 130 provide a compact motor assembly 100 compared to conventionally available brushless motors. Disposition of the one or more bearings 158 and 160 and at least a portion of the support plate 130 within the stator assembly 110 and within the rotor core 108 reduces the length of the motor assembly 100 and the overall power tool and improves power density.

In an embodiment, motor assembly 100 defines a motor envelope 120 bounded by a rear plane 122 at a rearmost point of the motor assembly 100 (i.e., at the rearmost point of the stator assembly 110), a front plane 124 at a frontmost point of the motor assembly 100 (i.e., at the frontmost point of the stator assembly 110), and a generally cylindrical boundary 126 extending from the rear plane 122 to the front plane 124 and surrounding a radially outermost portion of the motor assembly 100 (e.g., a radially outermost portion of the stator assembly 110) not including terminal block 121. In the illustrated embodiment, the rear plane 122 is at a rearmost point of the stator assembly 110 (including its windings 113), the front plane 124 is at a frontmost point of the stator assembly 110 (including its windings 113), and the generally cylindrical boundary 126 surrounds a radially outermost portion of the stator assembly 110. However, it should be understood that the rear plane may be at a rearmost point of the rotor 104 (if that extends further rearward than the stator assembly 110), the front plane may be at a frontmost point of the rotor 104 (if that extends further frontward than the stator assembly 110), and the generally cylindrical boundary may be at an outermost point of the rotor 104 (if that extends further radially outward than the stator assembly 110, e.g., in an outer rotor motor). The motor envelope 120 may have a length L1 from the rear plane 122 to the front plane 124 of approximately 16 mm to 20 mm (e.g., approximately 18.4 mm) and a diameter D1 of the cylindrical boundary 126 of approximately 40 mm to 60 mm (e.g., approximately 51 mm), with a volume of approximately 20 cm$^2$ to 56 cm$^2$ (e.g., approximately 38 cm$^2$). In an embodiment, at least a portion of at least one of the motor bearings 158 and 160 and at least a portion of the support plate 130 are received within the motor envelope 120.

Figure 4:
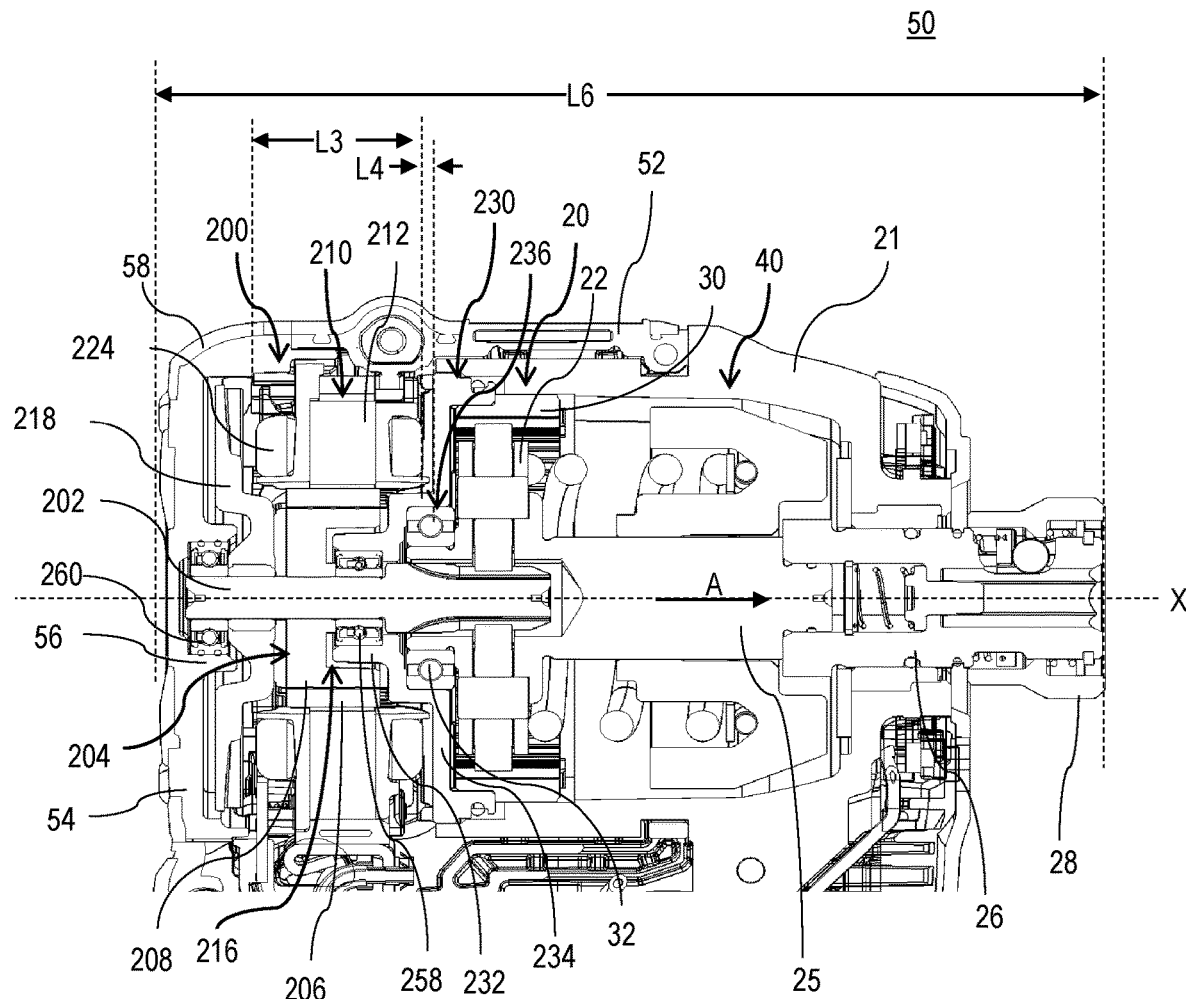
FIG. 4 depicts a side cross-sectional view of a second embodiment of a power tool including a motor assembly and support plate sized and optimized to reduce the length of the power tool, according to an embodiment.

An alternative embodiment of a power tool 50 is described herein with reference to FIGS. 4-10. FIG. 4 depicts a side cross-sectional view of the power tool 50 including a motor assembly 200 and support plate 230 sized and optimized to reduce the length of the power tool 50, according to an embodiment. In an embodiment, power tool 50 includes many of the same features as power tool 10 described above, such as transmission assembly 20, impact mechanism 40, output spindle 26, tool holder 28, handle 13, trigger 15, battery receptacle 17, etc., details of which are not repeated here, except as necessary to describe this alternative embodiment. In an embodiment, a rear end cap 50 is mounted on a rear end of the housing 52 rearward of the motor assembly 200. In this embodiment, the support plate 130 is designed to locate the cam carrier bearing 32 along the same radial plane as at least an end of the stator windings, so the cam carrier bearing 32 is located at least partially within an envelope formed by the ends of the motor assembly 200.

In an embodiment, motor assembly 200 includes many of the same features described above with reference to FIG. 1. In an embodiment, motor assembly 200 includes a rotor shaft 202, an inner rotor 204 mounted on the rotor shaft 202 having a surface-mount magnet ring 206 on a rotor core 208, and a stator assembly 210 located around the rotor 204. The stator assembly 210 includes a stator core 212, a series of stator teeth 214 radially projecting inwardly from the stator core 212, and a series of conductive windings 113 wound around the stator teeth 214 to define three phases connected in a wye or a delta configuration.

In an embodiment, the motor assembly 200 defines a tool axis X extending through the center of the rotor shaft 202 extending from a rear of the power tool 50 (i.e., where the rear end cap 50 is located) to a front of the power tool (i.e., where tool holder 28 is located). In this disclosure, the terms "rear" and "front" are used to describe positions of various components along the tool axis X in the direction A shown in FIG. 4. Thus, as an example, the motor assembly 200 is disposed rearwardly of the transmission assembly 20.

In an embodiment, the rotor core 208 is mounted on the rotor shaft 202 and includes an annular recess 216 around the rotor shaft 202 on one side of the rotor core 208 for positioning of one or more of the rotor bearings 258 and 260. The rotor core 212 may be made of a solid core piece of metal or lamination stack that includes a series of parallel laminations. The annular recess 216 may be carved or stamped out of the rotor core 212, or it may be formed using ring-shaped laminations. The rotor magnet 106 may be ring-sized or segmented, and it may be surface-mounted or embedded within the rotor core 208.

Figure 5:
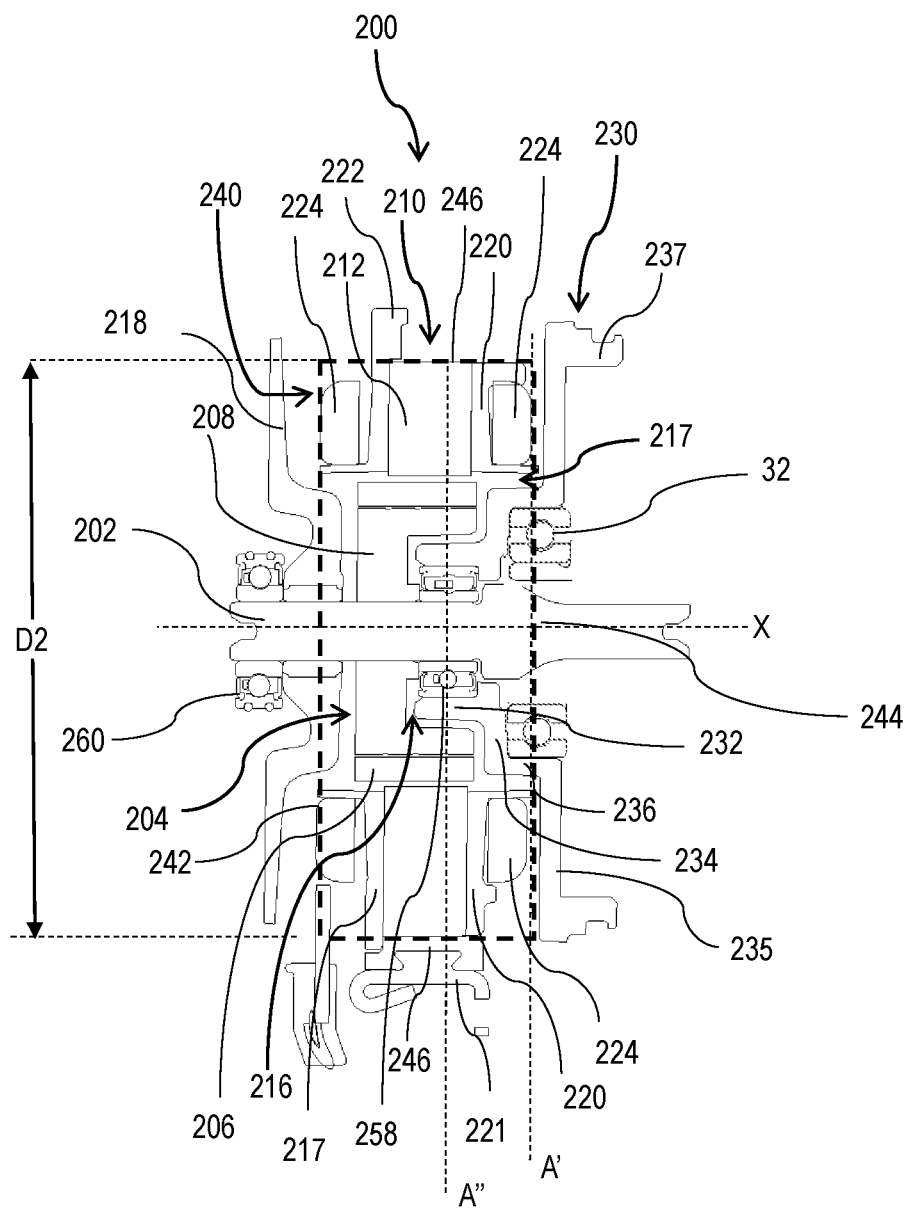
FIG. 5 depicts a zoomed-in side cross-sectional view of the support plate and the motor assembly, according to an embodiment.
Figure 6:
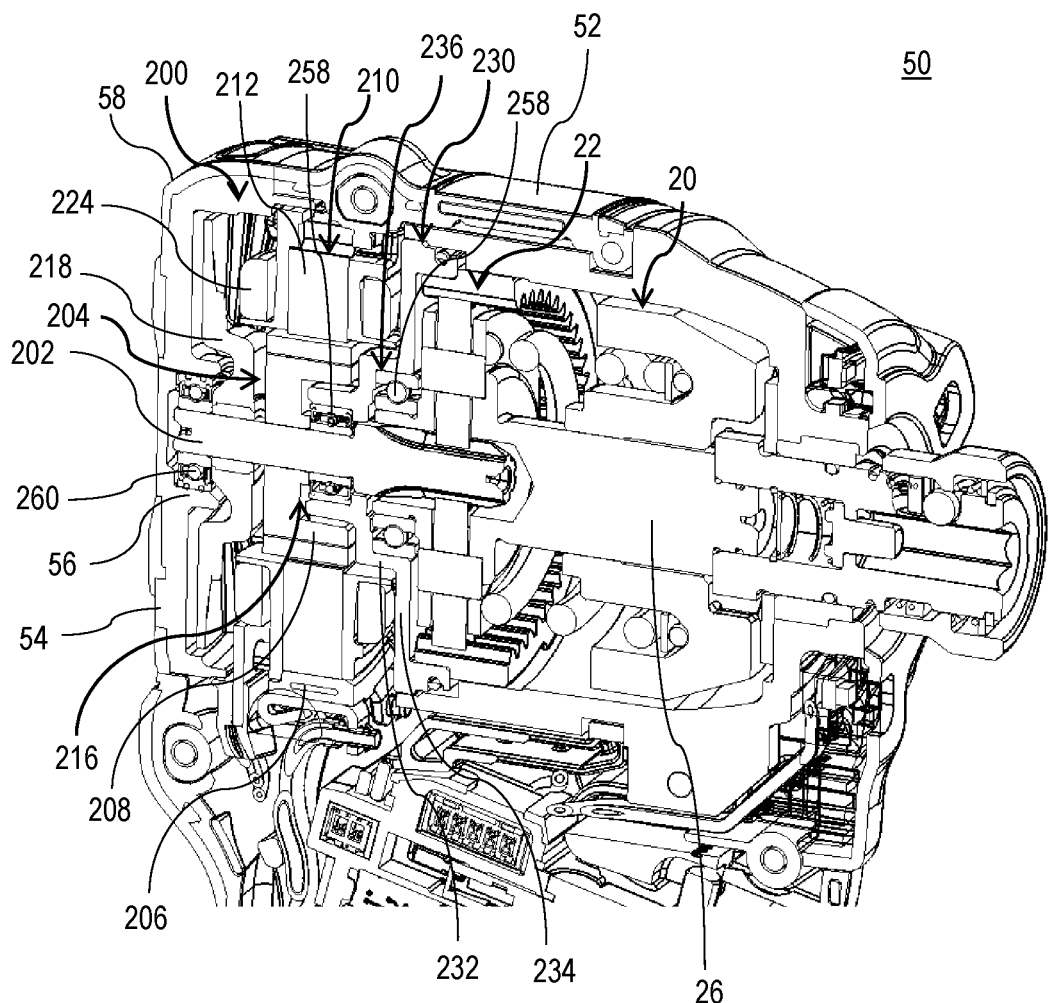
FIG. 6 depicts a perspective cross-sectional view of the motor assembly, according to an embodiment.
Figure 7A:
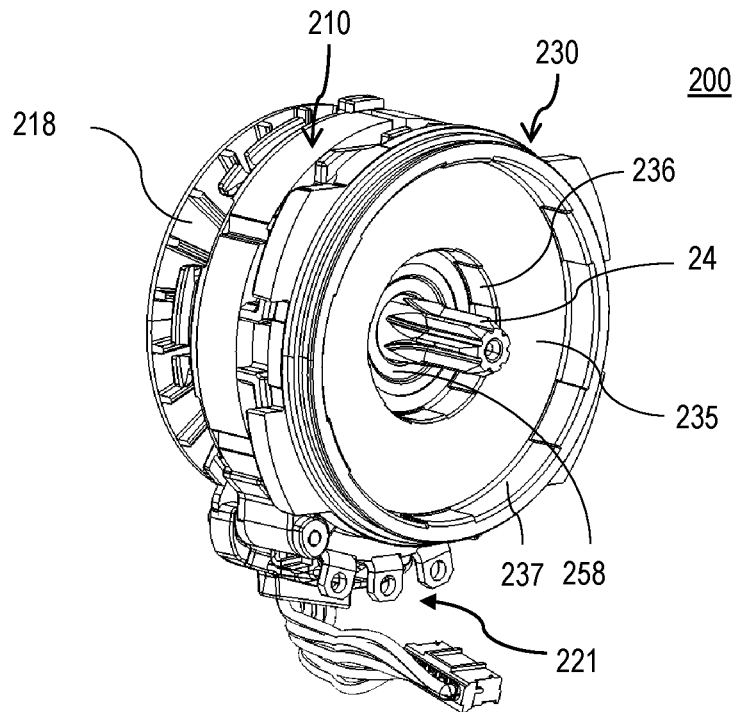
FIGS. 7A and 7B depicts perspective and side views of the motor assembly respectively, according to an embodiment.
Figure 7B:
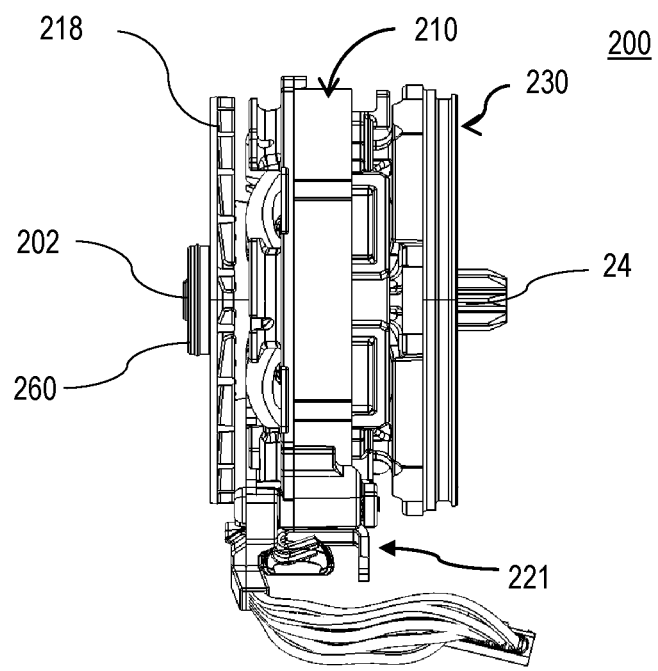
Figure 8A:
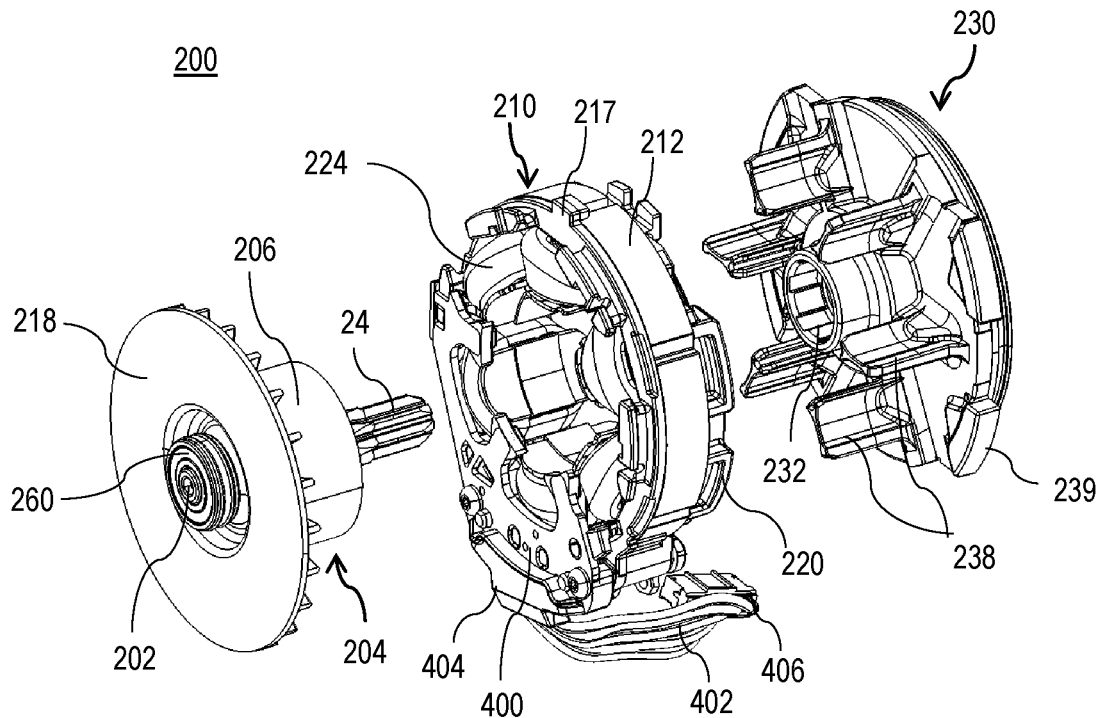
FIGS. 8A and 8B depict two perspective exploded views of the same motor assembly, according to an embodiment.
Figure 8B:
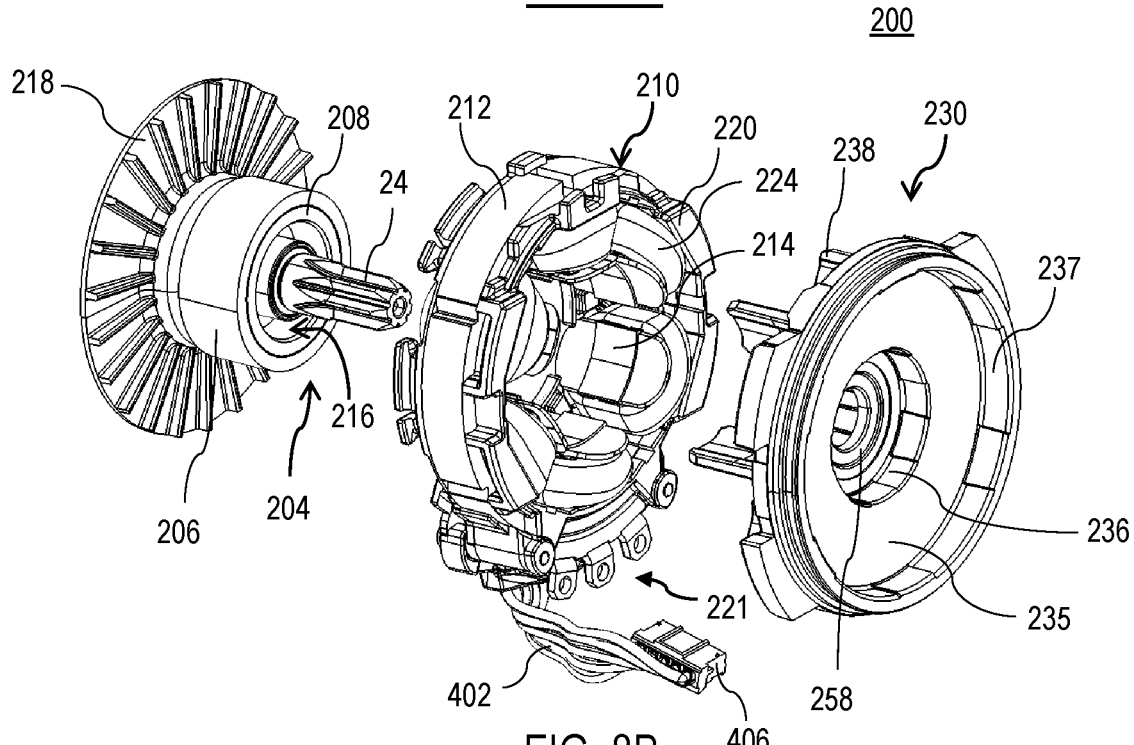

FIG. 5 depicts a zoomed-in side cross-sectional view of the support plate 230 and the motor assembly 200, according to an embodiment. FIG. 6 depicts a perspective cross-sectional view of the motor assembly 200, according to an embodiment. FIGS. 7A and 7B depicts perspective and side views of the motor assembly 200 respectively, according to an embodiment. FIGS. 8A and 8B depict two perspective exploded views of the same motor assembly 200, according to an embodiment. Various aspects of the motor assembly 200 ant the support plate 230 are described with reference to these figures.

In an embodiment, the support plate 230 includes a first bearing pocket 232 formed as a cylindrical or rim-shaped projection from a radial portion 234 for supporting at least the front motor bearing 258. The first bearing pocket 232 of the support plate 230 at least partially projects into and is received within the annular recess 216 of the rotor 204. This allows the front bear motor bearing 258 to be received at least partially within the stator assembly 210 and within an envelope of the rotor core 208 defined by the radial surfaces of the rotor core 208.

In an embodiment, the support plate 230 further includes a second bearing pocket 236 for supporting the cam carrier bearing 32. The second bearing pocket 236 may be formed as a recessed portion of the radial portion 234 of the support plate 230 facing away from the first bearing pocket 232. In an embodiment, second bearing pocket 236 is formed as an intermediate annular portion formed between the radial portion 234 and a radial wall 235, where the radial portion 234 is located along a radial plane that intersects a portion of the stator assembly 210, and the radial wall 235 is located adjacent a front end of the stator assembly 210. As such, the radial portion 234 extends between a front end of the first bearing pocket 232 and a rear end of the second bearing pocket 236. In an embodiment, the radial wall 235 extends from the front end of the second bearing pocket 236 radially outwardly and is supported by either the tool housing 52 or the stator assembly 210. In an embodiment, support plate 230 further includes an outer rim portion or lip 237 projecting axially forward from an outer circumference of the radial wall 235 for coupling with an outer portion of the transmission housing 21 and/or the tool housing 52 and for receiving and supporting a component of the transmission assembly 20, such as the ring gear 30 of the transmission assembly 20.

In an embodiment, the second bearing pocket 236 has a larger inner diameter than the first bearing pocket 232. In an embodiment, second bearing pocket 236 has approximately the same inner diameter as the outside surface of the rotor core 208. In an embodiment, the outer surface of the second bearing pocket 236 is received within the opening of the stator 210, i.e., within the inner diameter formed by front ends of the stator windings 224 adjacent the rotor 204. In an embodiment, the outer annular surface of the second bearing pocket 236 may be in physical contact with the stator windings 224 or a front end insulator 220 of the stator assembly 210, though in the illustrated figured, a small air gap 217 radially separates the outer annular surface of the second bearing pocket 236 from the stator windings 224 and the front end insulator 220 of the stator assembly 210.

In an embodiment, the cam carrier bearing 32 is received within the second bearing pocket 236 so that it is at least partially nested within the stator assembly 210 along a radial plane A' that intersects the front ends of the stator windings 224.

In an embodiment, the motor assembly 200 defines a motor envelope 240 similar to the motor envelope 120 of the motor 100, described above. The motor envelope 240 is bounded by a rear plane 242 at a rearmost point of the motor assembly 200 (i.e., at the rearmost point of the stator assembly 210), a front plane 244 at a frontmost point of the motor assembly 200, and a generally cylindrical boundary 246 extending from the rear plane 242 to the front plane 244 and surrounding a radially outermost portion of the motor assembly 200 (e.g., a radially outermost portion of the stator assembly 210). In the illustrated embodiment, the rear plane 242 is at a rearmost point of the stator assembly 210 (including its stator windings 224), the front plane 244 is at a frontmost point of the stator assembly 210 (including its stator windings 224), and the generally cylindrical boundary 246 surrounds a radially outermost portion of the stator assembly 210 (not including the terminal block 221). However, it should be understood that the rear plane may be at a rearmost point of the rotor 204 (if that extends further rearward than the stator assembly 210), the front plane may be at a frontmost point of the rotor 204 (if that extends further frontward than the stator assembly 210), and the generally cylindrical boundary may be at an outermost point of the rotor 204 (if that extends further radially outward than the stator assembly 210, e.g., in an outer rotor motor). As shown in FIGS. 4 and 5, the motor envelope 240 may have a length L3 from the rear plane 242 to the front plane 244 of approximately 16 mm to 20 mm (e.g., approximately 18.4 mm) and a diameter D1 of the cylindrical boundary 246 of approximately 40 mm to 60 mm (e.g., approximately 51 mm), with a volume of approximately 20 $cm^2$ to 56 $cm^2$ (e.g., approximately 38 $cm^2$). In an embodiment, at least a portion of the front motor bearing 258 and at least a portion of the support plate 230 are received within the motor envelope 120.

In an embodiment, as best seen in FIGS. 8A and 8B, support plate 230 is provided with radially outwardly extending axial posts or fins 238 provided for piloting and supporting the support plate 230 relative to the stator assembly 210. In an embodiment, axial posts 238 are received within respective slots of the stator assembly 210 formed circumferentially between stator windings 224. In an embodiment, axial posts 238 come into contact with the inner surface of the stator core 212 or adjacent inner tips of the stator teeth 214. In this manner, the support plate 230 is radially supported with respect to the stator assembly 210 independently of the power tool housing 52. In an embodiment, support plate 230 further includes one or more circumferential projections 239 that engage a portion of the tool housing 52 to provide axial support for the support plate 230 relative to the stator assembly 210. In an embodiment, a series of six axial posts 238 are provided, each project from a rear surface of the radial wall 235 around the first bearing pocket 232. In an embodiment, length of the axial posts 238 is approximately equal to or greater than the length of the first bearing pocket 232 in the direction of the stator assembly 210 to allow the axial posts 238 to extend into the slots of the stator assembly 210. Reference is made to US Patent Publication No. 2017/0294819A1, which is incorporated herein by reference in its entirety, for a description of the axial posts for piloting and support of a bearing support structure relative to the inner diameter of the stator.

In an alternative embodiment not shown here, instead of axial posts 238, the support plate 230 may be piloted and supported via one or more circumferential constraining walls that extend over the outside surface of the stator core 212. Reference is made to U.S. Pat. No. 10,056,806, which is incorporated herein by reference in its entirety, for a description of the peripheral walls for piloting and support of a bearing support structure relative to the outer diameter of the stator.

In an embodiment, stator assembly 210 includes front and rear end insulators 220 and 222 disposed on axial ends of the stator core 212 to electrically insulate the stator windings 224 from the stator core 212. In an embodiment, one or more of the end insulators 220 and 222 support a terminal block 221 on the lower surface of the stator core 212. The terminal block 221 includes a series of motor terminals that connect via a series of wires to a power module (not shown) disposed in the tool housing 52 to receive electric power. The motor terminals are also electrically connected to the stator windings 224. In an embodiment, the terminal block 221 is provided along a radial plane A" that also intersects the front motor bearing 258 and the rotor magnet ring 206.

In an embodiment, both motor bearings 258 and 260 may be supported at least partially within the rotor annular recess 216 if the length of the stator core 212 and the corresponding length of the rotor core 208 is sufficiently large to accommodate both motor bearings 258 and 260. Alternatively, in an embodiment as shown in FIG. 2, where the length of the rotor core 208 is not sufficiently large to receive both bearings 258 and 260 within the annular recess 216, the front motor bearing 258 is supported within the annular recess 216 of the rotor core 212 while the rear motor bearing 260 is supported in rear tool cap 54 of the tool housing 52. In an embodiment, rear tool cap 54 includes a radial body that includes a central bearing pocket 56 for supporting the rear motor bearing 260. In an embodiment, rear tool cap 54 includes a peripheral portion 58 that is secured to the tool housing 52. Alternatively, the rear tool cap 54 may be formed integrally as a part of the clamshell that forms the tool housing 52.

In an embodiment, fan 218 is mounted on the rotor shaft 202 to rotate with the rotation of the motor 200. The fan 218 includes a radial main body and a plurality of blades facing the stator assembly 210. In an embodiment, an inner portion of the fan 218 is recessed to allow the rear motor bearing 260 to be nested at least partially in the axial directed within the fan 218 to be aligned radially with the main body of the fan 218. The central bearing pocket 56 of the rear tool cap 54 is axially received within the recess portion of the fan 218 around the rear motor bearing 260. In this manner, positioning of the rear motor bearing 260 within the rear tool cap 54 does not pose a significant increase in the overall length of the motor assembly 200.

In an embodiment, motor assembly 200 includes a circuit board (hereinafter referred to as Hall board) 400 is mounted on the stator assembly 210. Hall board 400 includes a series of magnetic (Hall) sensors arranged to sense a magnetic flux of the magnet ring 206. A series of signal wires 402 are coupled to a first connector 404 that is mounted on the Hall board 400 on one end and a second connector 406 that is coupled to the controller (not shown) on the other end. The signal wires 402 provide signals related to an angular position of the rotor 204 to the controller.

Figure 9:
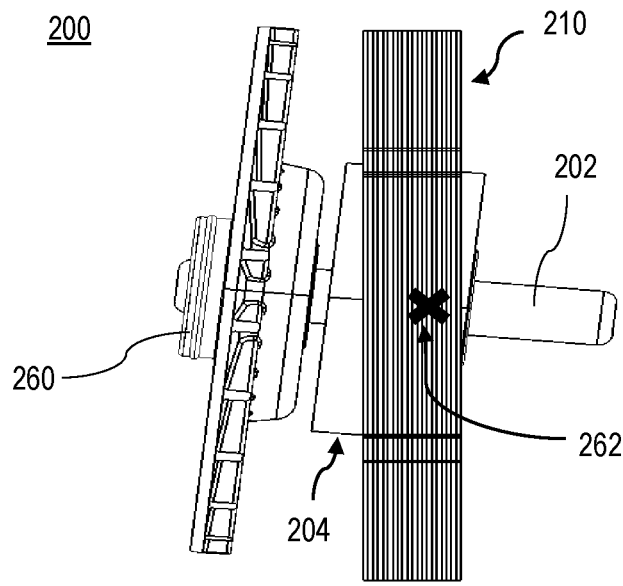
FIG. 9 depict a side view of the motor assembly of FIG. 2 to illustrate an advantage of the support plate and nested rotor bearing configuration, according to an embodiment.

FIG. 9 depict a side view of the motor assembly 200 of FIG. 2 to illustrate an advantage of the support plate configuration described above, where the front motor bearing 258 is nested within the envelope of the stator assembly 210 and at least partially within the rotor 204. In the event of egregious movement of the rotor shaft 202 due to a fall, high vibration, or high impact, the rotor shaft 202 may be pivoted away from the longitudinal axis relative to the stator assembly 210. This pivoting movement may take place around a pivot point 262 aligned with the front motor bearing 258. The pivot point 262 is associated with tolerances in the bearings of the front motor bearing 258, tolerances between the front motor bearing 258 and the rotor 204, and/or tolerances between the front motor bearing 258 and the stator assembly 210. Since the pivot point 262 is located within the envelope of the stator assembly 210, in the event of such a pivoting movement of the rotor shaft 202, the likelihood that the rotor shaft 202 makes physical contact with the stator assembly 210 is significantly reduced.

Figure 10:
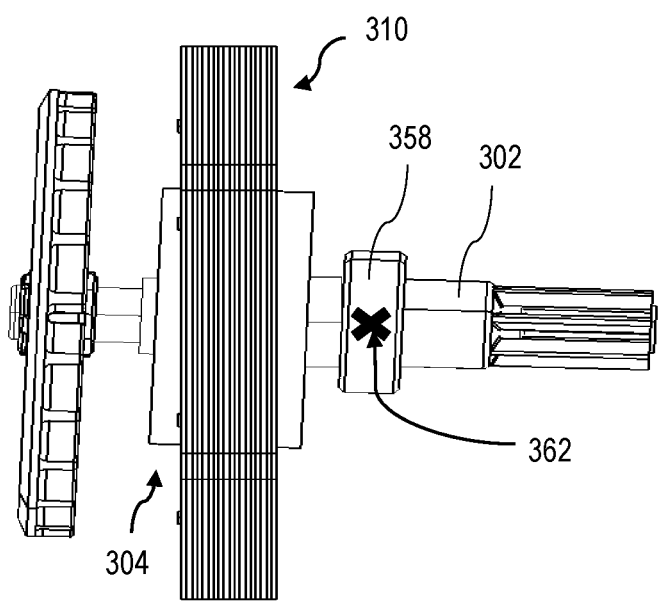
FIG. 10 depicts a side view of a prior art motor without a nested rotor bearing.

By comparison, FIG. 10 depicts a side view of a prior art motor 300, in which the front rotor bearing 358 is not nested within the rotor 304 and therefore provided outside the envelope of the stator assembly 310. In an embodiment, in the event of egregious rotor shaft movement, the pivot point 362 for pivoting movement of the rotor shaft 302 relative to the longitudinal axis is located away from the stator assembly 310. Thus, in the event of a pivoting movement of the rotor shaft 302, there is a likelihood that the rotor shaft 302 makes physical contact with a portion of the stator assembly 310.

Various embodiments of the rotor 204 including the outer magnet ring 206 are described here with reference to FIGS. 11-14.

Figure 11:
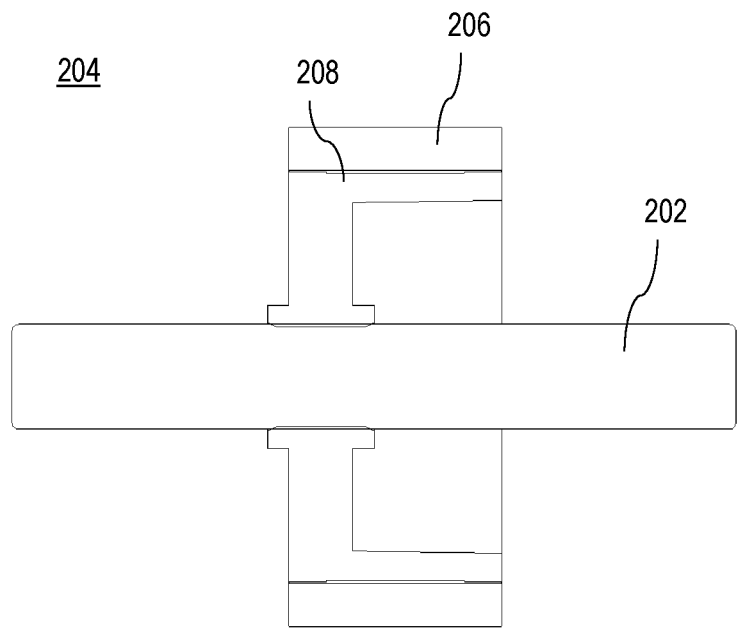
FIG. 11 depicts a side cross-sectional view of the rotor, according to an embodiment.
Figure 12:
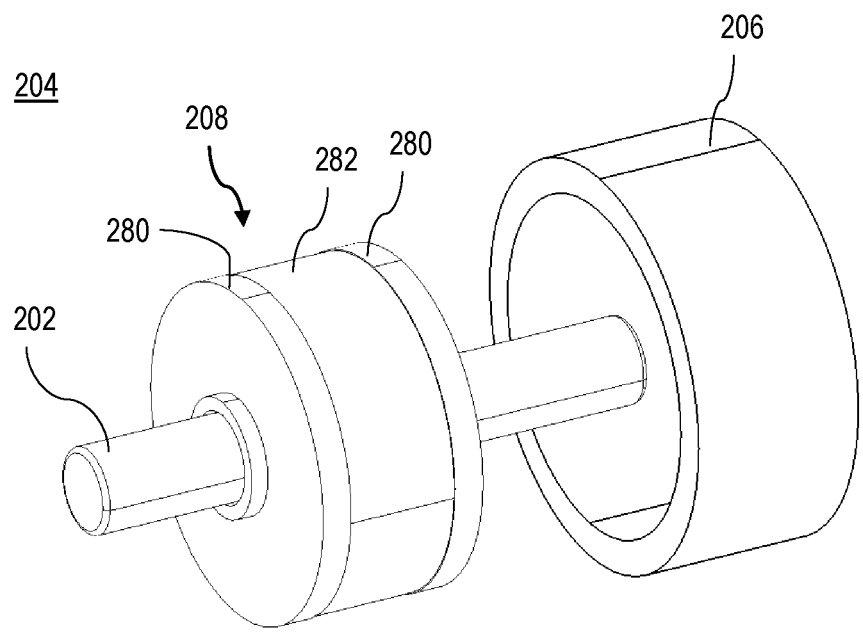
FIG. 12 depicts a perspective exploded view of the rotor, according to an embodiment.

FIG. 11 depicts a side cross-sectional view of the rotor 204, according to an embodiment. FIG. 12 depicts a perspective exploded view of the rotor 204, according to an embodiment. In an embodiment, as described briefly previously, the rotor 204 includes a permanent magnet ring 206 that is sized to be received over an outside surface of the rotor core 208. The magnet ring 206 may be made of sintered, hot-extrusion (MQ3), bonded, and/or injection-molded magnetic material. In another embodiment, the magnet ring 206 comprises a sintered magnet including magnet alloy that is pulverized, magnetically aligned within a magnetic field for magnetization, press molded, and then sintered. In an embodiment, magnet ring 206 may comprise a series of discrete permanent magnets mounted on the rotor core 208 as a unit. In an embodiment, the discrete magnets may be bonded together before or after magnetization. In an embodiment, the rotor core 208 may include a fully annular body.

In an embodiment, to properly secure the magnet ring 206, a thin layer of adhesive is provided between the magnet ring 206 and the rotor core 208. To accommodate the adhesive, in an embodiment, the inner diameter of the magnet ring 206 in this case is slightly greater than the outer diameter of the rotor core 208. This may cause the magnet ring 206 to be acentric relative to the rotor core 208.

Alternatively, in an embodiment, as shown in FIGS. 11 and 12, the rotor core 208 includes two annular alignment rings 280 at its two axial ends. Annular alignment rings 280 may be provided by carving out a middle area 282 of the rotor core 208 such that each of the annular alignment rings 280 have a slightly greater diameter than the middle area 282, e.g., by approximately 0.1 mm to 0.6 mm, preferably 0.1 mm to 0.3 mm. The adhesive (not shown) is applied on the middle area 282 of the outer surface of the rotor core 208 for retaining the magnet ring 206. Annular alignment rings 280 have approximately the same diameter as the inner diameter of the magnet ring 206 to ensure a tight fit and proper alignment between the magnet ring 206 and the rotor core 208.

Figure 13:
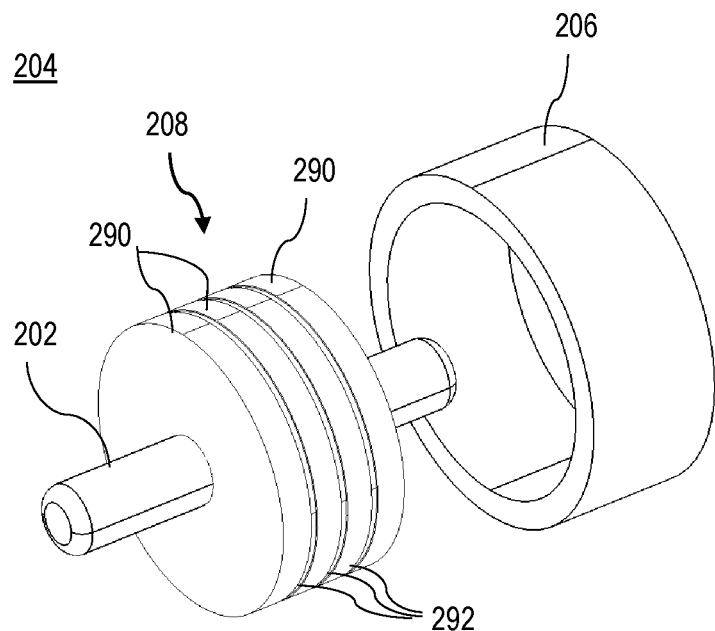
FIG. 13 depicts a perspective exploded view of the rotor, according to another embodiment.

FIG. 13 depicts a perspective exploded view of the rotor 204, according to another embodiment. In this embodiment, rotor core 208 includes a series of alignment rings 290, forming annular grooves 292 therebetween. Annular grooves 292 may be, for example, 0.05 to 0.3 mm deep relative to the outer surface of the rotor core 208. The adhesive (not shown) is applied within the grooves 292 for retaining the magnet ring 206. Annular alignment rings 290 have approximately the same diameter as the inner diameter of the magnet ring 206 to ensure a tight fit and proper alignment between the magnet ring 206 and the rotor core 208. Alternatively, in an embodiment, annular alignment rings 290 has a slightly smaller diameter than the inner diameter of the magnet ring 206 to allow the adhesive to spread over the outer surface of rotor core 208, though this arrangement may require an additional equipment for proper alignment of the rotor core 208 and the magnet ring 206.

Figure 14:
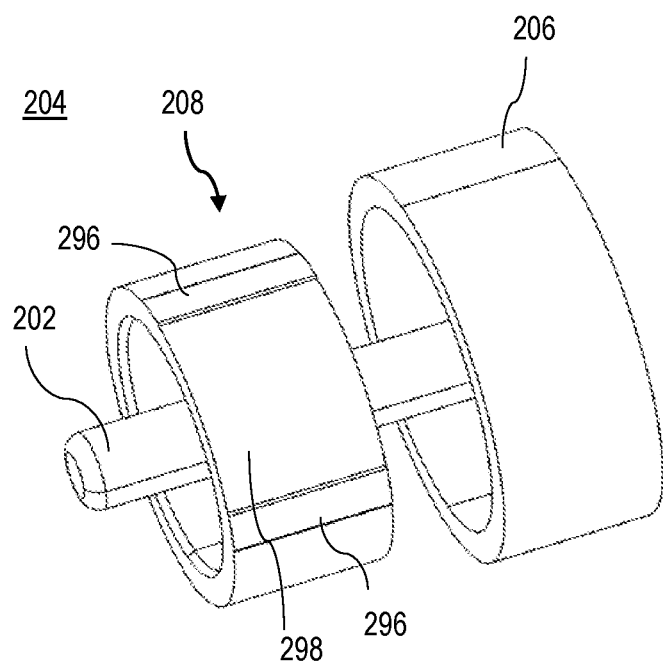
FIG. 14 depicts a perspective exploded view of the rotor, according to yet another embodiment.

FIG. 14 depicts a perspective exploded view of the rotor 204, according to yet another embodiment. In this embodiment, rotor core 208 includes a series of axial pads 296 along its outer surface. Axial pads 296 project from the outer surface of the rotor core 208 by approximately 0.05 mm to 0.3 mm, forming a series of axial channels 298 in between. The adhesive (not shown) is applied within the axial channels 298 on the outer surface of the rotor core 208 for retaining the magnet ring 206. The inner diameter of the magnet ring 206 is sized to be form-fittingly received in contact with the axial pads 296 to ensure a tight fit and proper alignment between the magnet ring 206 and the rotor core 208.

An alternative embodiment of the rotor construction is described herein with reference to FIGS. 15-19, according to an embodiment.

Figure 15:
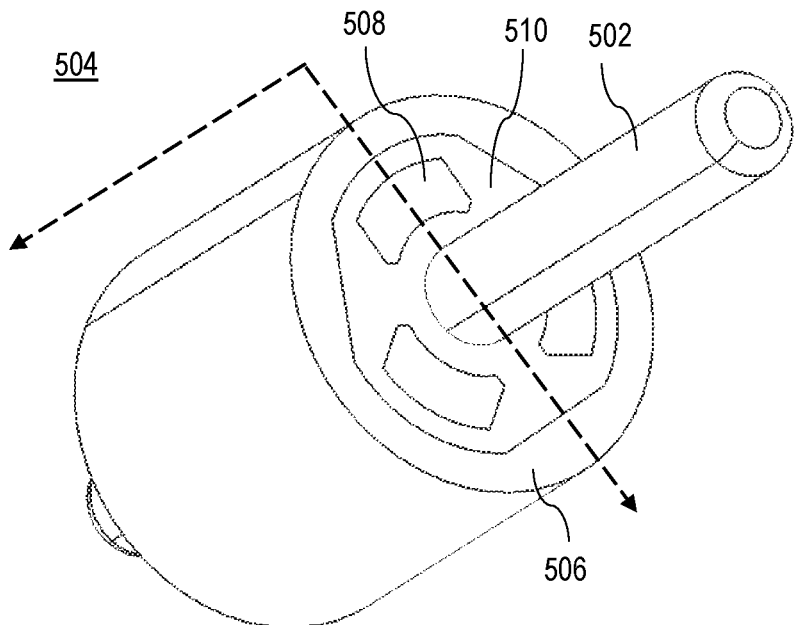
FIG. 15 depicts a perspective view of a rotor, according to an embodiment.

FIG. 15 depicts a perspective view of a rotor 504, according to an embodiment. In an embodiment, rotor 504 includes a rotor core 508 mounted on a rotor shaft 502 and an outer permanent magnet ring 506 that is sized to be received over an outside surface of the rotor core 508. As described above, the magnet ring 506 may be made of sintered, hot-extrusion (MQ3), bonded, and/or injection-molded magnetic material. In another embodiment, the magnet ring 506 comprises a sintered magnet including magnet alloy that is pulverized, magnetically aligned within a magnetic field for magnetization, press molded, and then sintered. In an embodiment, magnet ring 506 may comprise a series of discrete permanent magnets mounted on the rotor core 508 as a unit. In an embodiment, the discrete magnets may be bonded together before or after magnetization.

In an embodiment, the magnet ring 506 is secured to the rotor core 508 via a mold structure 510. The mold structure 510, as described below, fill in any gap between the rotor core 508 and the magnet ring 506 to structurally support the magnet ring 506. In an embodiment, the mold structure 510 provides axial, radial, and rotational support for the magnet ring 506 relative to the rotor core 508.

Figure 16:
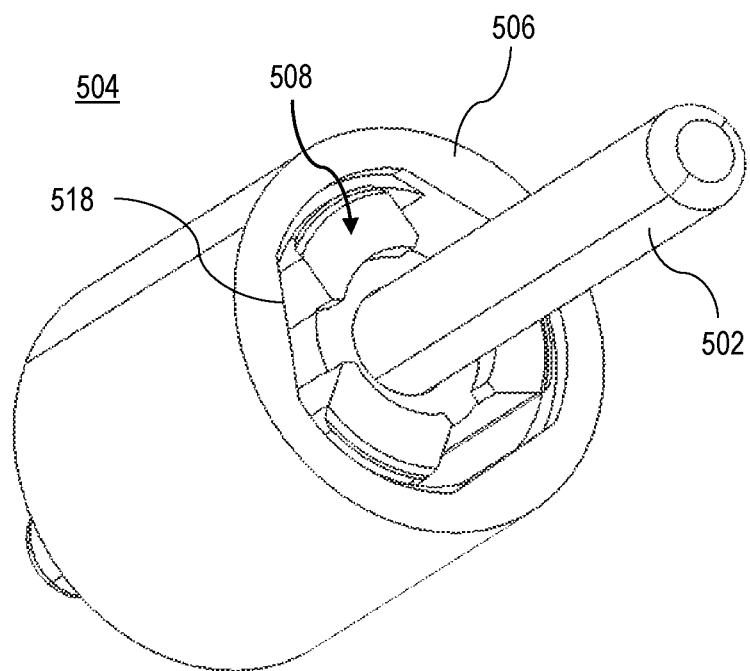
FIG. 16 depicts a prospective view of the rotor prior to injection-molding or over-molding of the mold structure, according to an embodiment.
Figure 17:
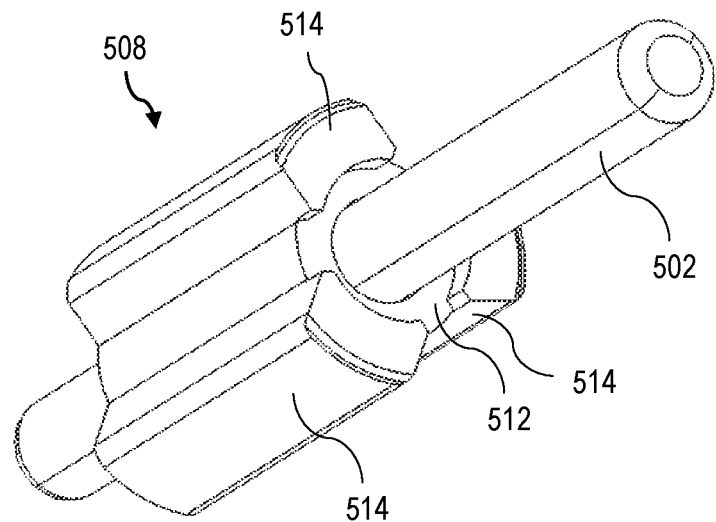
FIG. 17 depicts a perspective view of the rotor core and the rotor shaft alone, according to an embodiment.
Figure 18:
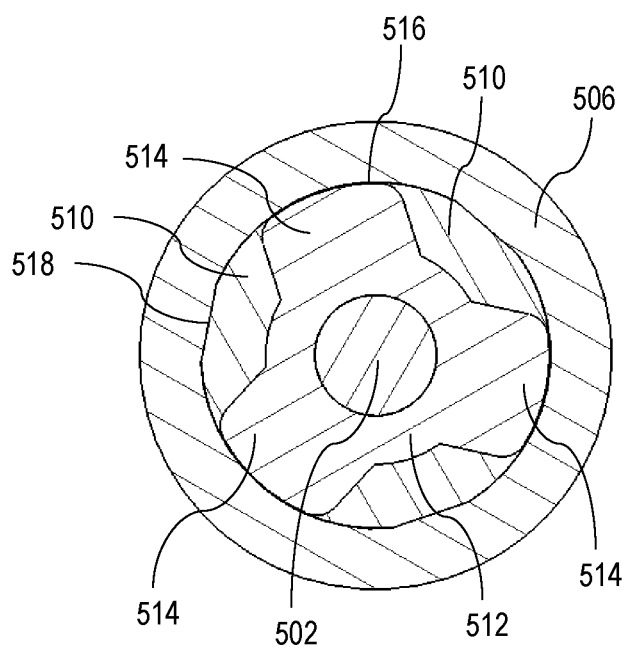
FIG. 18 depicts a cross-sectional view of the rotor along a radial plane, according to an embodiment.
Figure 19:
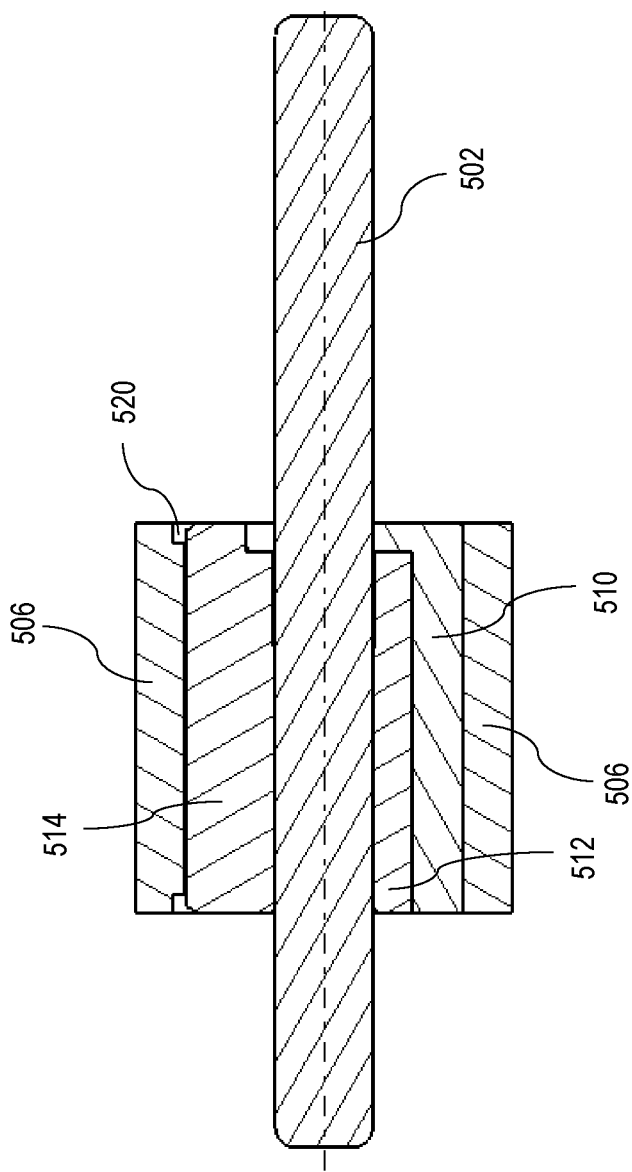
FIG. 19 depicts a cross-sectional view of the rotor along plane A denoted in FIG. 15, according to an embodiment.
Figure 20:
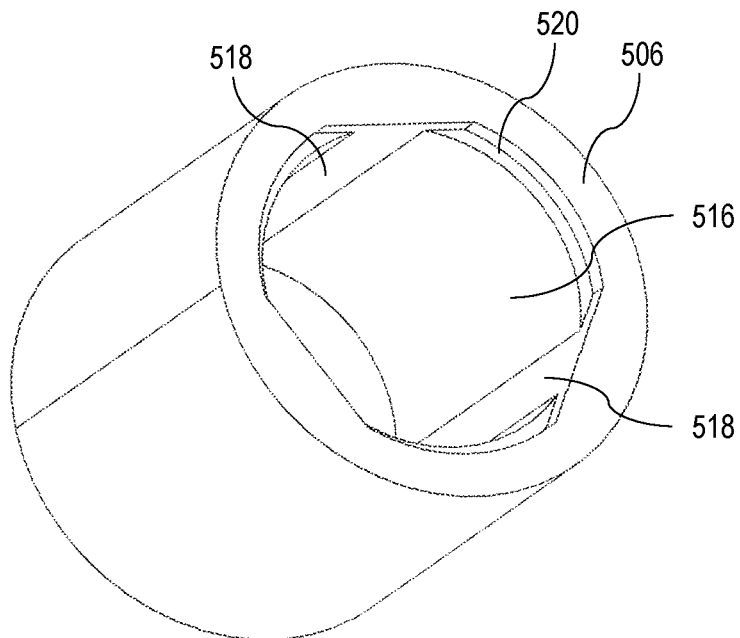
FIGS. 20 and 21 depict perspective angular and axial views of the magnet ring, according to an embodiment.
Figure 21:
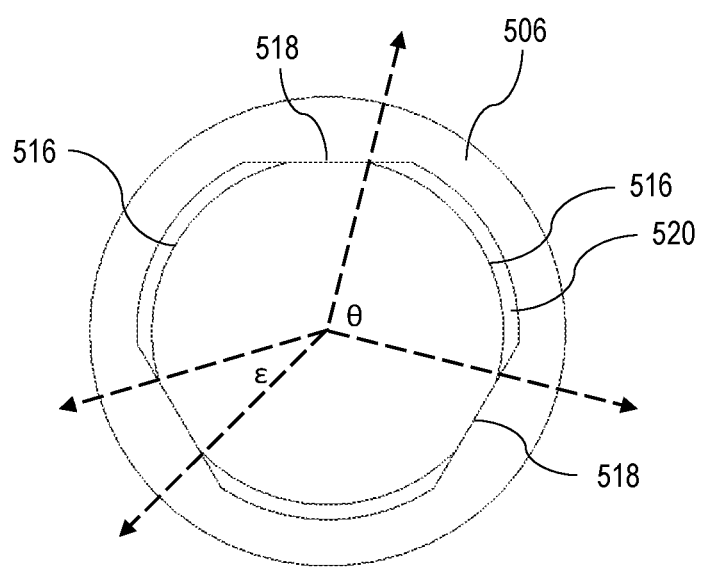

FIG. 16 depicts a prospective view of the rotor 504 prior to injection-molding or over-molding of the mold structure 510, according to an embodiment. FIG. 17 depicts a perspective view of the rotor core 508 and the rotor shaft 502 alone, according to an embodiment. FIG. 18 depicts a cross-sectional view of the rotor 502 along a radial plane, according to an embodiment. FIG. 19 depicts a cross-sectional view of the rotor 502 along plane A denoted in FIG. 15, according to an embodiment. FIGS. 20 and 21 depict perspective angular and axial views of the magnet ring 506, according to an embodiment.

As shown in these figures, rotor core 508 includes a cylindrical inner body 512 that is mounted on the rotor shaft 502 and a series of radial projections 514 that project outwardly from the inner body 512 in the radially direction but extend along the inner body 512 and form axial channels in between along the axial direction. In an embodiment, radial projections 514 extend along at least the length of the inner body 512. In the depicted embodiment, radial projections 514 extend approximately 2-5 mm beyond the end of the inner body 512 along the axial direction, providing a recessed area within the end surface of the rotor core 508 within which the mold structure 510 is received. The outer surfaces of the radial projections 514 cooperatively form a cylindrical profile having substantially the same diameter as the inner surface of the magnet ring 506. The magnet ring 506 is rigidly mounted in sliding contact with the outer surfaces of the radial projections 514.

In an embodiment, mold structure 510 is configured to locate within any gap between the magnet ring 506 and the rotor core 508, including the axial channels and recessed areas of the end surface of the rotor core 508, to securely retain the magnet ring 506 relative to the rotor core 508. In an embodiment, mold structure 510 is provide in lieu of, or in addition to, any adhesive disposed between the rotor core 508 and the magnet ring 506. In an embodiment, mold structure 510 extends axially from a first plane defined by one end of the magnet ring 506 and/or one end of the radial projections 514 of the rotor core 508, and a second plane defined by the other end of the magnet ring 506 and/or the other end of the radial projections 514 of the rotor core 508.

In an embodiment, the inner surface of the magnet ring 506 includes a series of arcuate surfaces 516 that are oriented along approximately the same circumference and are in sliding contact with the outer surfaces of the radial projections 514. The arcuate surfaces 516 cooperate with the radial projections 514 to radially secure the magnet ring 506 relative to the rotor core 508. Moreover, in an embodiment, the inner surface of the magnet ring 506 includes a series of flat surfaces 518 extending between the arcuate surfaces 516. Flat surfaces 518 of the magnet ring 506 cooperate with the mold structure 510 to rotationally fix the magnet ring 506 to the rotor core 508.

In an embodiment, the number of arcuate surfaces 516 and the number of flat surfaces 518 correspond to the number of radial projections 514 of the rotor core 508. In this exemplary embodiment, rotor core 508 includes three radial projections 514, and magnet ring 506 includes three arcuate surfaces 516 and three flat surfaces 518 arranged alternatingly. In an embodiment, each arcuate surface 516 extends at an angle θ of approximately 80 to 100 degrees, preferably approximately 85 to 95 degrees. In an embodiment, each flat surface 518 extends at an angle c of approximately 20 to 40 degrees, preferably approximately 25 to 35 degrees.

In an embodiment, arcuate surfaces 516 include end indentations 520 on at least one of the axial ends of the magnet ring 506. End indentations 520 owing to axial ends of the arcuate surfaces 516 being slightly recessed by a few millimeters relative to the axial end of the magnet ring 506. Mold structure 510 is configured to fill in the gap formed by the end indentations 520. In this manner, the mold structure 510 provides axial support for the magnet ring 506 relative to the rotor core 508. End indentations 520, and thus axial retention of the magnet ring 506, may be provided on one or both ends of the magnet ring 506. Additionally, and/or alternatively, in an embodiment, though not shown in these figures, one or more end caps may be provided at one or both ends of the magnet ring 506 for axial support.

Figure 22:
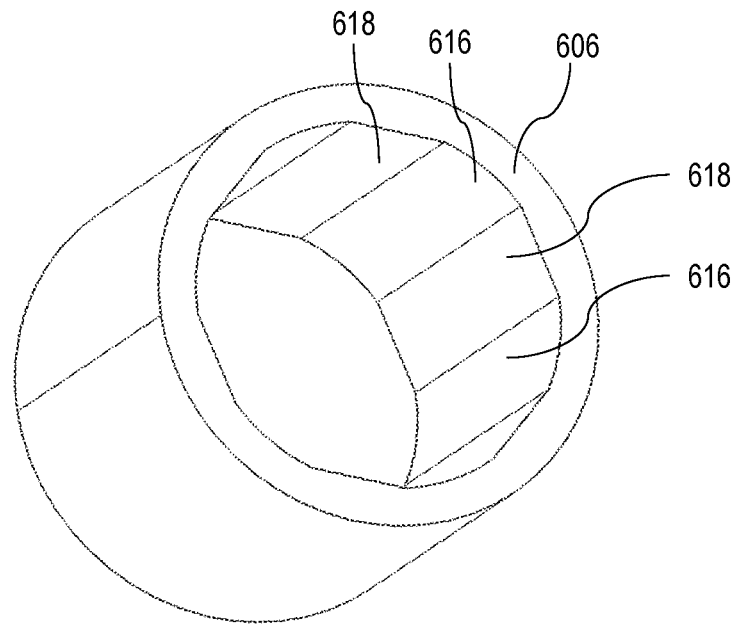
FIGS. 22 and 23 depict angular and axial perspective views of a magnet ring, according to an alternative embodiment.
Figure 23:
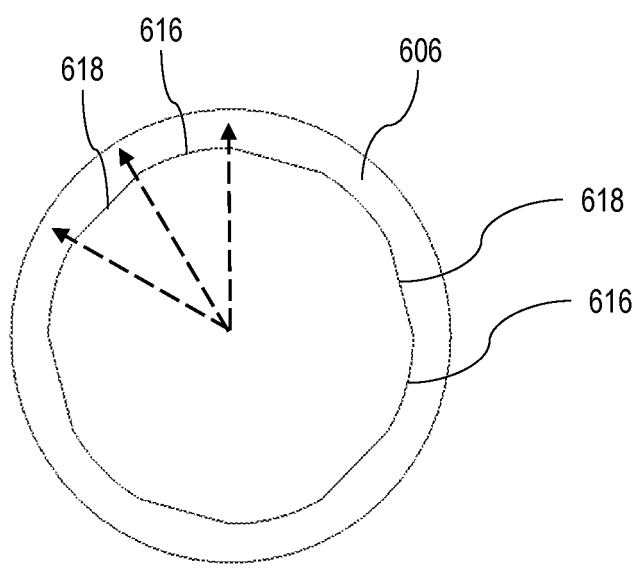

FIGS. 22 and 23 depict angular and axial perspective views of a magnet ring 606, according to an alternative embodiment. In this embodiment, magnet ring 606 includes a series of arcuate surfaces 616 and a series of flat surfaces 618 extending along the axial direction and located alternatingly around the inner circumference of the magnet ring 606. The arcuate surfaces 616 and flat surfaces 618 are of approximately the same angular and lateral width. In the exemplary embodiment, a total of six arcuate surfaces 616 and six flat surfaces 618 are alternatingly provided, each at an angle of approximately 30 degrees. This arrangement allows for the magnet ring 606 to be mounted on a rotor core having a greater number of radial projections and/or narrower radial projections than the previously described embodiment. In an embodiment, the arcuate surfaces 616 slidingly contact and cooperate with the radial projections of the rotor core to radially secure the magnet ring 606 relative to the rotor core. In an embodiment, the flat surfaces 618 cooperate with the mold structure to rotationally fix the magnet ring 606 to the rotor core.

Figure 24:
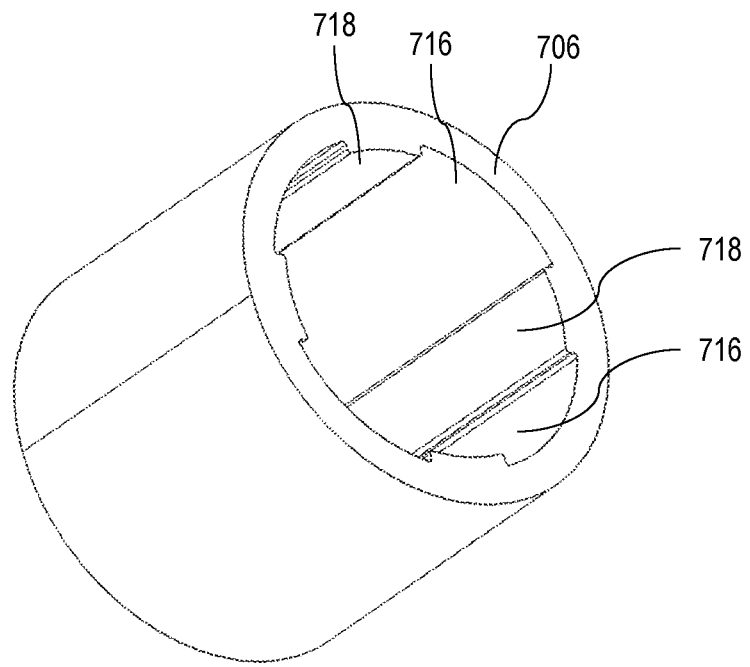
FIGS. 24 and 25 depict angular and axial perspective views of a magnet ring, according to another alternative embodiment.
Figure 25:
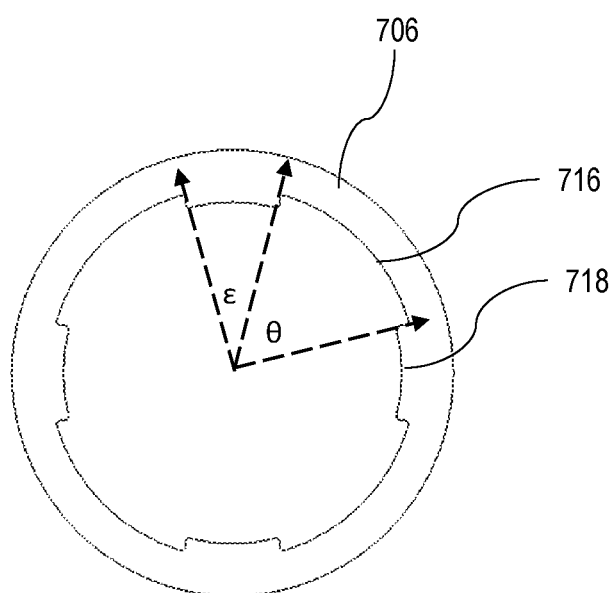

FIGS. 24 and 25 depict angular and axial perspective views of a magnet ring 706, according to another alternative embodiment. In this embodiment, magnet ring 706 includes a series of recessed arcuate surfaces 716 and a series of projected arcuated surfaces 718 located alternatingly around the inner circumference of the magnet ring 706. In an example, this embodiment is similar to magnet ring 506 of the previous embodiment but including projected arcuate surfaces 718 instead of flat surfaces 518. In an embodiment, each recessed arcuate surface 716 extends at an angle θ of approximately 50 to 70 degrees, preferably approximately 60 degrees. In an embodiment, each projected arcuate surface 718 extends at an angle c of approximately 20 to 40 degrees, preferably approximately 30 degrees. In an embodiment, the recessed arcuate surfaces 716 slidingly contact and cooperate with the radial projections of the rotor core to radially secure the magnet ring 706 relative to the rotor core. In an embodiment, projected arcuate surfaces 718 cooperate with the mold structure to rotationally fix the magnet ring 706 to the rotor core.

Figure 26:
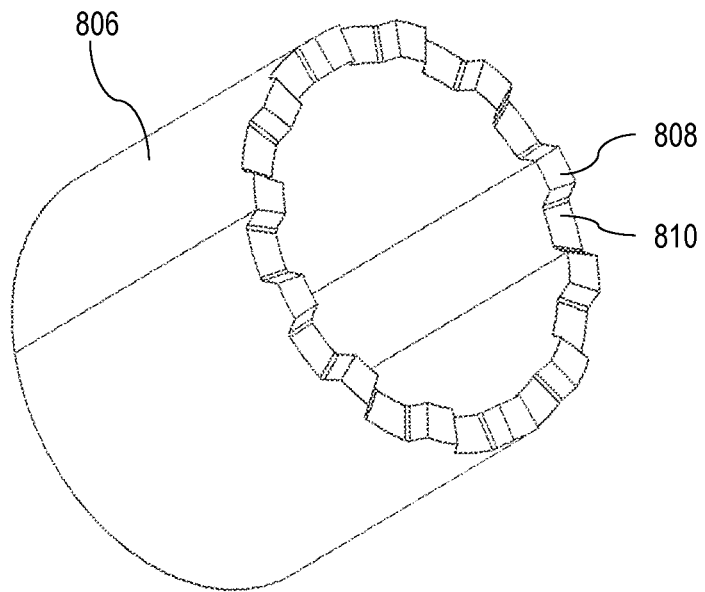
FIGS. 26 and 27 depict angular and axial perspective views of a magnet ring, according to yet another alternative embodiment.
Figure 27:
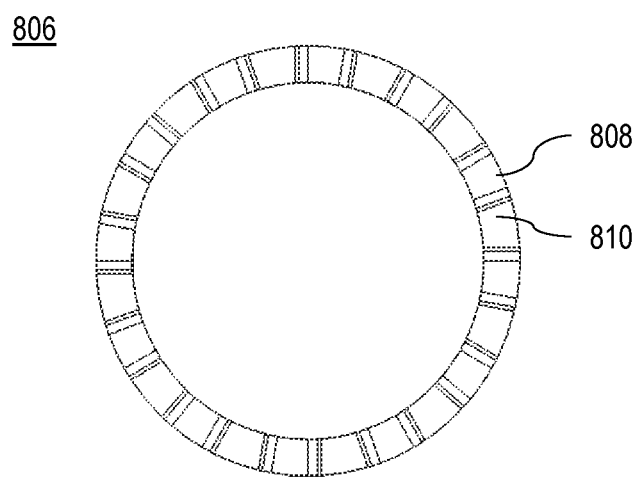

FIGS. 26 and 27 depict angular and axial perspective views of a magnet ring 806, according to yet another alternative embodiment. In this embodiment, magnet ring 806 includes substantially cylindrical inner and outer surfaces. An axial end surface of the magnet ring 806 includes a series of spaced-apart bumps 808, forming grooves 810 in between. In an embodiment, the mold structure is formed so as to engage the bumps 80 and fill in the grooves 810 at the axial end of the magnet ring 806 to rotationally fix the magnet ring 806 to the rotor core.

Another embodiment of the invention is described herein with reference to FIGS. 28-34.

Figure 28:
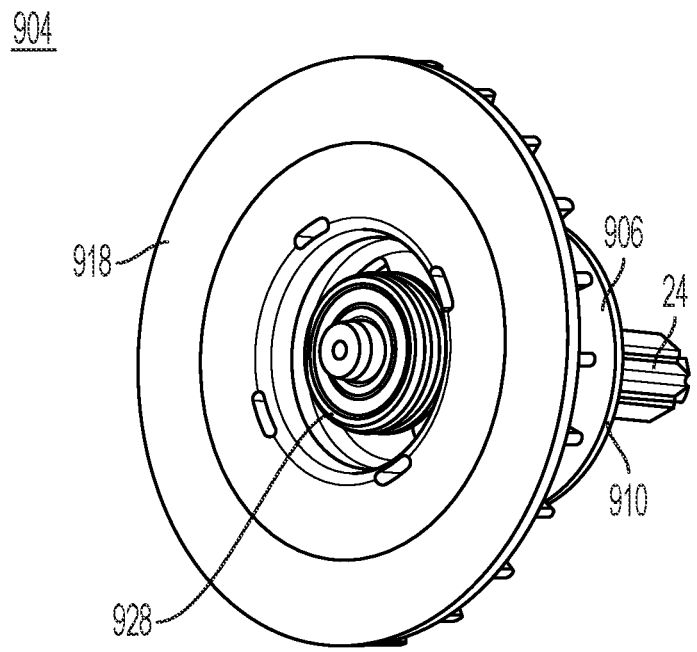
FIGS. 28 and 29 depict two perspective views of a rotor, according to another embodiment.
Figure 29:
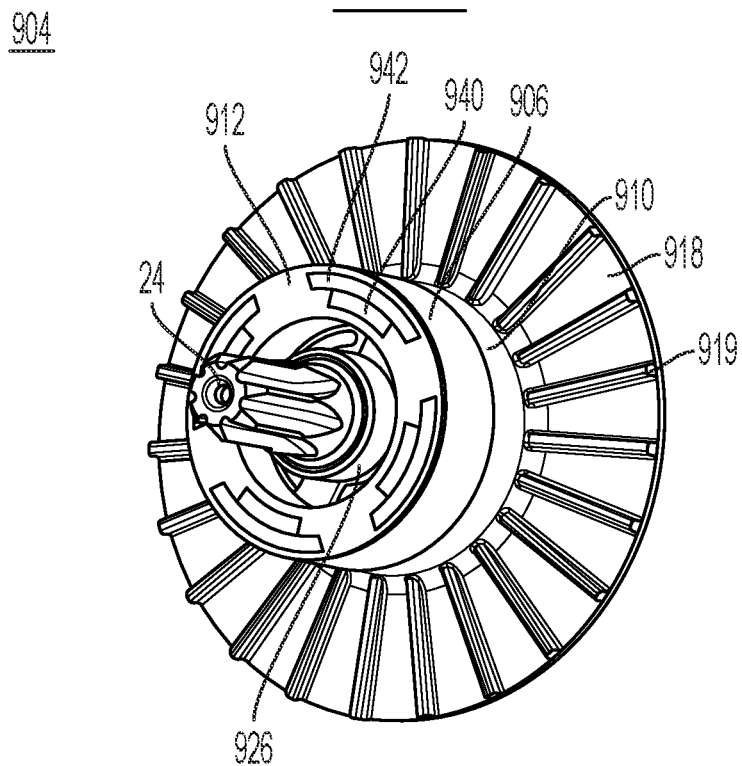
Figure 30:
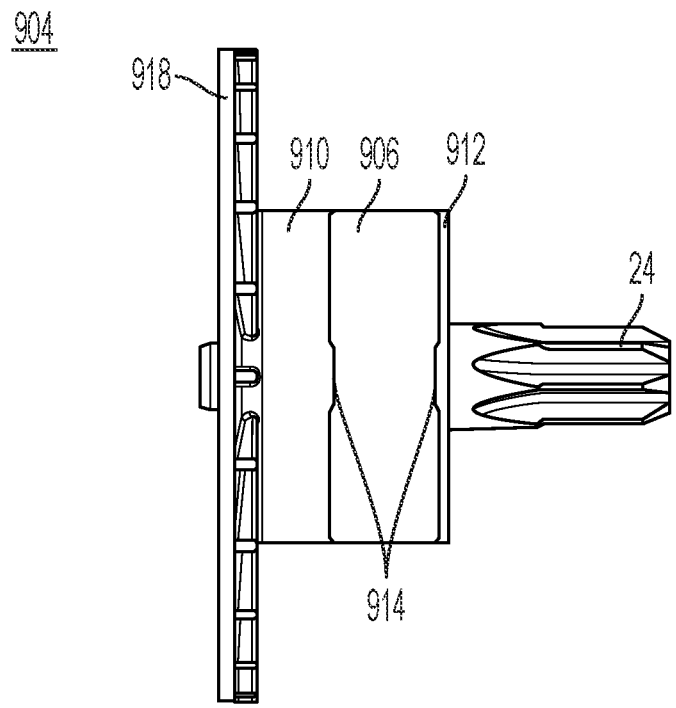
FIG. 30 depicts a side perspective view of the rotor, according to an embodiment.
Figure 31:
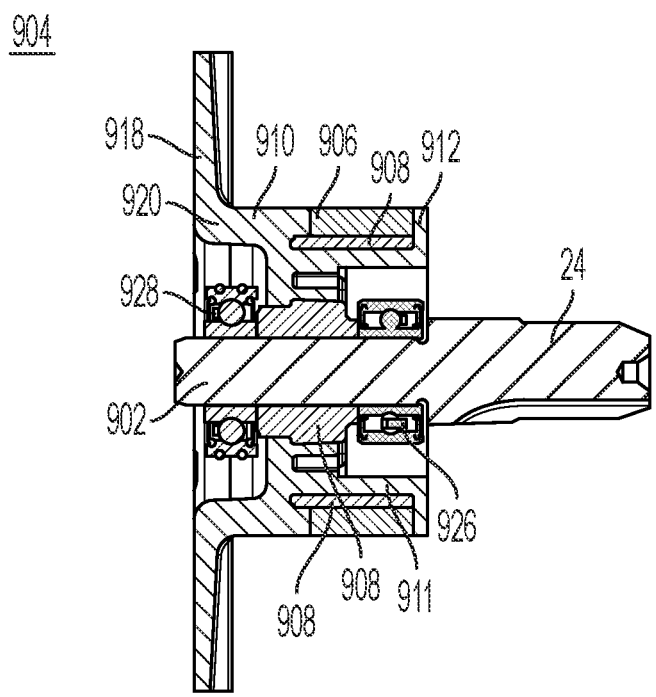
FIG. 31 depicts a side cross-sectional view of the rotor, according to an embodiment.
Figure 32:
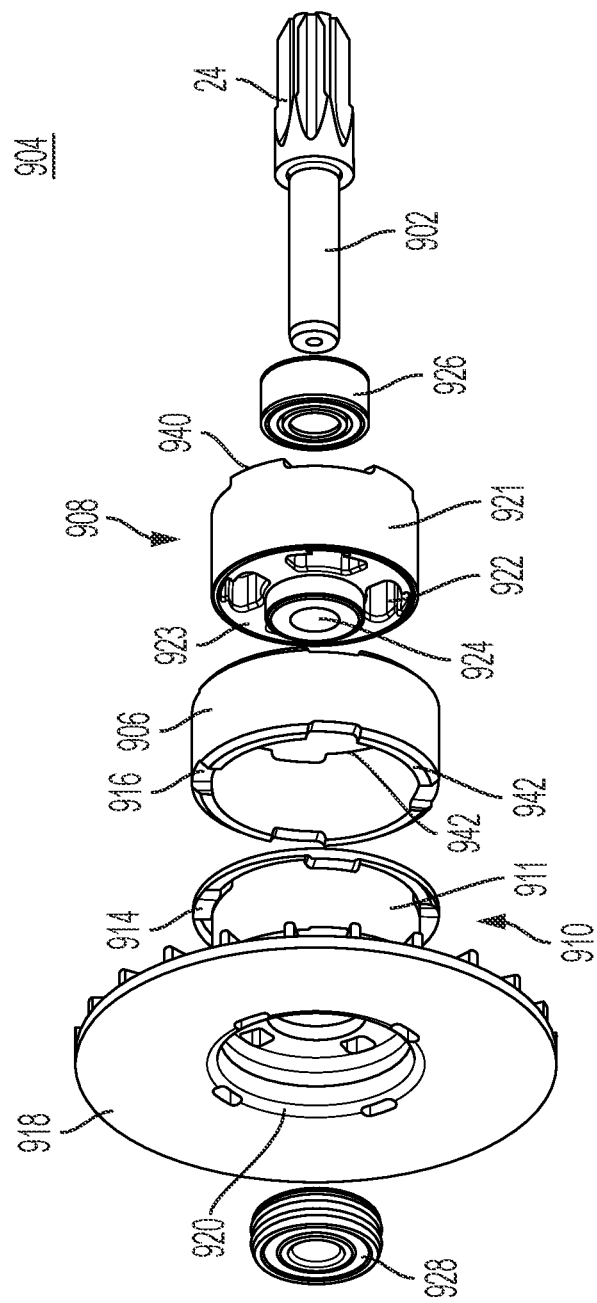
FIG. 32 depicts a side exploded view of the rotor, according to an embodiment.

FIGS. 28 and 29 depict two perspective views of a rotor 904, according to an embodiment. FIG. 30 depicts a side perspective view of the rotor 904, according to an embodiment. FIG. 31 depicts a side cross-sectional view of the rotor 904, according to an embodiment. FIG. 32 depicts a side exploded view of the rotor 904, according to an embodiment.

With reference to these figures, according to an embodiment, rotor 904 includes a magnet ring 906 mounted around a rotor core 908, which in turn is mounted on a rotor shaft 902 driving the pinion 24. As described above, the magnet ring 906 may be made of sintered, hot-extrusion (MQ3), bonded, and/or injection-molded magnetic material. In another embodiment, the magnet ring 906 comprises a sintered magnet including magnet alloy that is pulverized, magnetically aligned within a magnetic field for magnetization, press molded, and then sintered. In an embodiment, magnet ring 906 may comprise a series of discrete permanent magnets mounted on the rotor core 908 as a unit. In an embodiment, the discrete magnets may be bonded together before or after magnetization.

A mold structure 910 secures the magnet ring 906 relative the outer surface of the rotor core 908. In an embodiment, mold structure 910 also includes other retention features to fix the magnet ring 906 axially and rotationally to the rotor core 908.

Further, in an embodiment, the mold structure 910 integrally forms a fan 918 rotatably coupled to the rotor 904. In an embodiment, the fan 918 is formed with a contoured inner body 920 adjacent one end of the rotor core 908. The contoured inner body 920 is shaped to allow the main body of the fan 918 including the blades 919 to be radially in line with a rear bearing 928 of the rotor shaft 902. In an embodiment, mold structure 910 includes a generally cylindrical body 911 that extends along the axial direction from the contoured inner body 920 of the fan 918.

Figure 33:
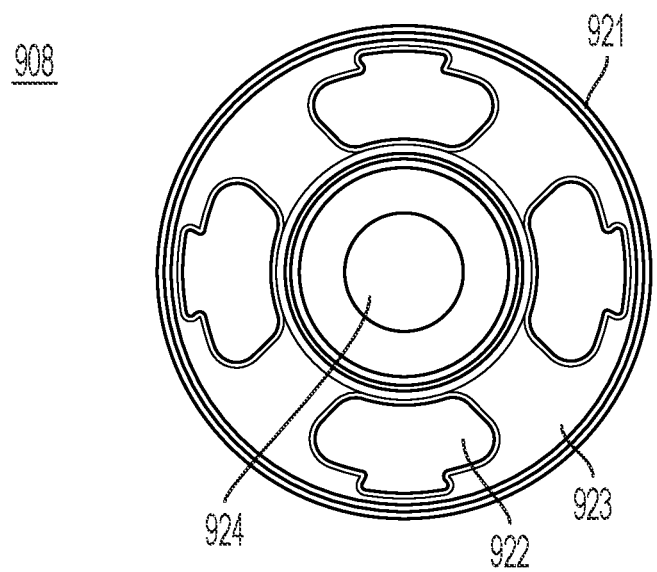
FIG. 33 depicts an axial view of the rotor core, according to an embodiment.
Figure 34:
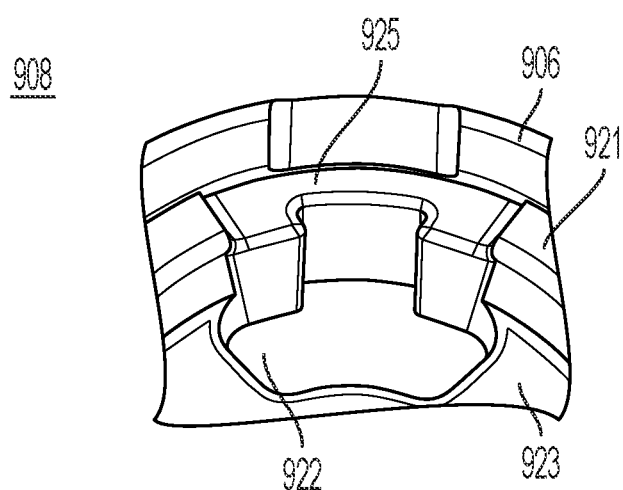
FIG. 34 depicts a partial perspective view of the rotor core, according to an embodiment.

FIG. 33 depicts an axial view of the rotor core 908, according to an embodiment. As shown here, and with continuous reference to FIGS. 28-32, rotor core 908 includes a cylindrical body 921 that has an open end in which a front bearing 926 of the rotor shaft 902 is received, and a closed end defined by a radial wall 923. In an embodiment, radial wall 923 forms a central opening 924 that is securely mounted, e.g., via press-fitting, on the rotor shaft 902, ensuring that the rotor core 908 is rotationally fixed to the rotor shaft 902. In an embodiment, radial wall 923 further includes a series of other openings 922 around the central opening 924. In an embodiment, mold structure 910 flows and forms through the openings 922 during the molding process, allowing the generally cylindrical body 911 of the mold structure 910 to cover the inner surface of the cylindrical body 921 of the rotor core 908. In an embodiment, the cylindrical body 911 may also include a thin layer located between the rotor core 908 and the magnet ring 906.

In an embodiment, rotor core 908 is fully made of steel material to maximize magnetic flux, providing a fully steel cylindrical body on which the magnet ring 906 is mounted. Alternatively, as shown in the partial view of FIG. 34, openings 922 extend to the outer periphery of the rotor core 908. In this embodiment, a series of plastic members 925 may be provided radially outwardly of the openings 922 and circumferentially aligned with the cylindrical body 921 to radially support the magnet ring 906.

Figure 35:
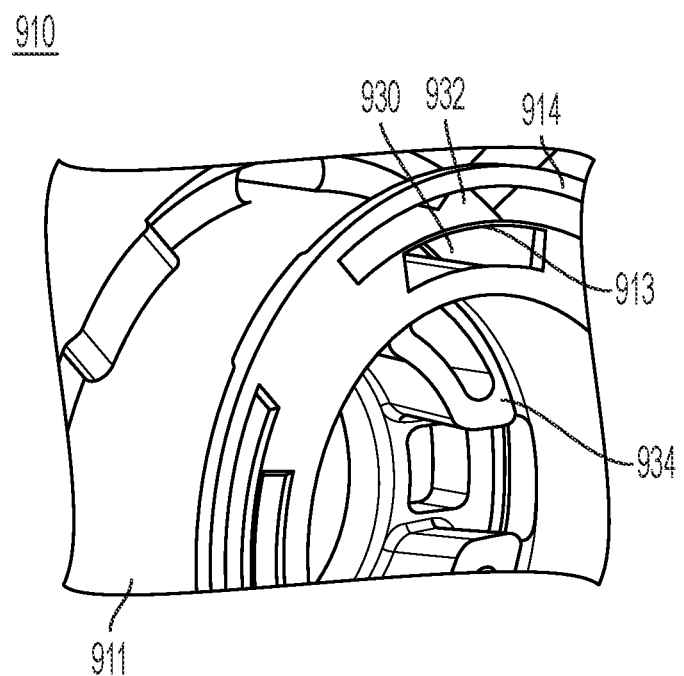
FIG. 35 depicts a partial view of the mold structure, according to an embodiment.

FIG. 35 depicts a partial view of the mold structure 910, according to an embodiment. As shown here, and with continuous reference to FIGS. 28-32, mold structure 910 includes penetrating portions 934 that pass through the openings 922 of the rotor core 908, connecting the cylindrical body 911 to the rest of the mold structure 910 that forms the fan 918.

In an embodiment, formed in the axial end of the cylindrical body 911 is a first series of slots 930 that receive corresponding axial tabs 940 of the rotor core 908. In this manner, the mold structure 910 is radially and rotationally secured to the rotor core 908. In an embodiment, this arrangement allows the mold structure 910 to fully cover the inner surface as well as the outer surface of the rotor core 908, forming a thin layer 913 of molded material between the rotor core 908 and the ring magnet 906.

In an embodiment, the mold structure 910 further includes a lip portion 914 that extends radially outwardly from the end of the cylindrical body 911 engaging the distal end of the ring magnet 906. The lip portion 914 engages the distal end of the ring magnet 906, allowing the mold structure 910 to also be axially secured to the ring magnet 906 on both ends. In an embodiment, the lip portion 914 has approximately the same circumference as the ring magnet 906. In an embodiment, the lip portion 914 further includes a second series of slots 932 radially outward of the first series of slots 930. The slots 932 receive corresponding axial tabs 942 of the magnet ring 906, thus radially and rotationally securing the magnet ring 906 to the mold structure 910.

This arrangement provides an easy and efficient construction system for the rotor, where the rotor core 908 and the magnet ring 906 are initially assembled together and molded in a single over-molding or injection-molding step that includes formation of the fan 918 as well as retention features for axial, radial, and rotational retention of the rotor components.

Figure 36:
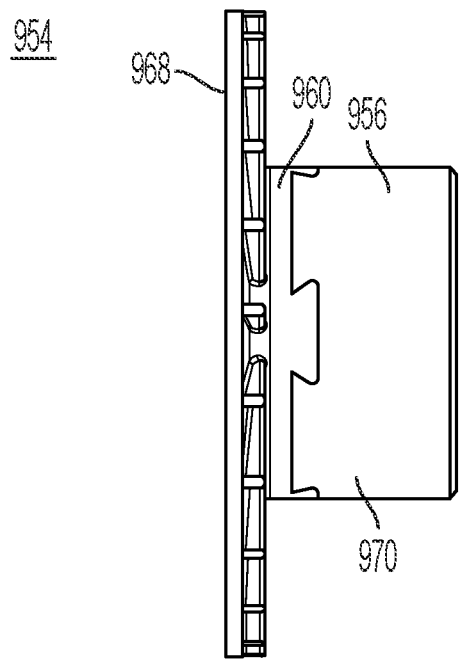
FIG. 36 depicts a side perspective view of a rotor, according to an alternative embodiment.
Figure 37:
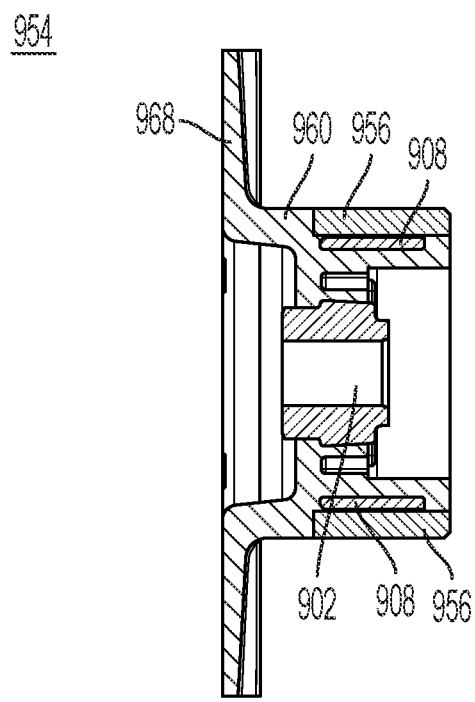
FIG. 37 depicts a side cross-sectional view of the rotor, according to an embodiment.

FIG. 36 depicts a side perspective view of a rotor 954, according to an alternative embodiment. FIG. 37 depicts a side cross-sectional view of the rotor 954, according to an embodiment.

In an embodiment, rotor 954 includes many of the same components described above, including a rotor core 908 mounted on a rotor shaft 902. In an embodiment, rotor 954 further includes a magnet ring 956 mounted on the rotor core 908 and a mold structure 960 that forms a fan 968 and is configured to axially and rotationally secure the magnet ring 956 to the rotor core 908. Unlike the previous embodiment, however, the mold structure 960 does reach both axial ends of the magnet ring 956. Rather, the magnet ring 956 includes a series of angled teeth 970 on one end closest to the fan 968 that is engaged by the mold structure 960, allowing the mold structure 960 to provide full axial and rotational support for the magnet ring 956 without reaching to the other end of the magnet ring 956.

Figure 38:
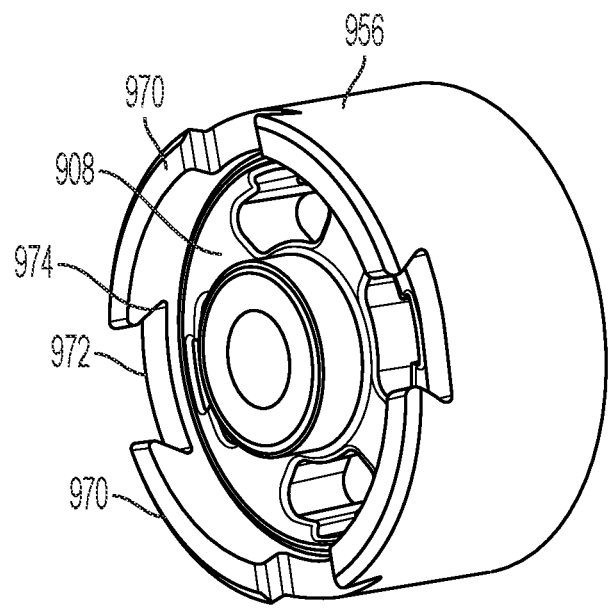
FIG. 38 depicts a perspective view of the rotor core, according to an embodiment.

FIG. 38 depicts a perspective view of the magnet ring 956 mounted on the rotor core 908, according to an embodiment. In an embodiment, angled teeth 970 of the magnet ring 956 extend axially beyond an end of the rotor core 908 facing the fan 968. In an embodiment, each angled tooth 970 includes side surfaces 974 that extend at an angle of approximately 30 to 60 degrees relative to the longitudinal axis. Each angled tooth 970 becomes wider in the direction opposite the rotor core 908. In an embodiment, where four angled teeth 970 are provided, four angled recesses 972 are formed between the angled teeth 970.

Figure 39:
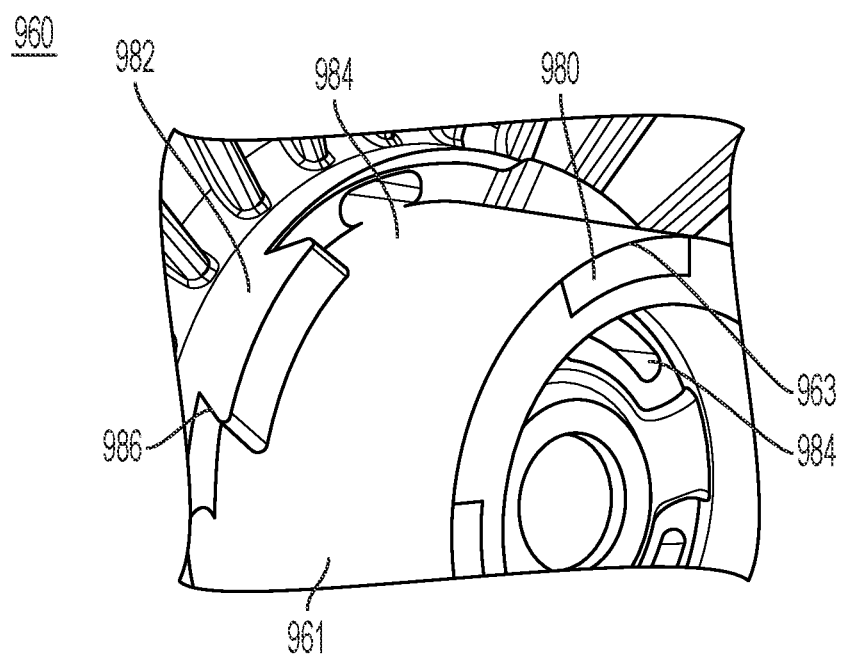
FIG. 39 depicts a partial view of the mold structure, according to an embodiment.

FIG. 39 depicts a partial view of the mold structure 690, according to an embodiment. In an embodiment, the mold structure 960 includes a cylindrical body 961 on which the fan 968 is formed, and penetrating portions 984 that pass through the openings 922 of the rotor core 908 for securement to the rotor core 908. In an embodiment, formed in the axial end of the cylindrical body 961 is a series of slots 980 that receive corresponding axial tabs 940 of the rotor core 908. In this manner, the mold structure 960 is radially and rotationally secured to the rotor core 908. In an embodiment, this allows the mold structure 960 to fully cover the inner surface as well as the outer surface of the rotor core 908, forming a thin layer 963 of molded material between the rotor core 908 and the ring magnet 956. In an embodiment, the mold structure 960 also includes surface projections 982 having angular side walls that are received into the angled recesses 972 of the magnet ring 956. This arrangement allows the mold structure 960 to be axially and rotationally secured to the magnet ring 956, thus axially and rotationally securing the magnet ring 956 to the rotor core 908.

Another aspect of the invention is described herein with reference to FIGS. 40 through 47. This aspect of the disclosure relates to use of a sleeve around the rotor magnet ring for retention of the magnet ring on the rotor core.

Figure 40:
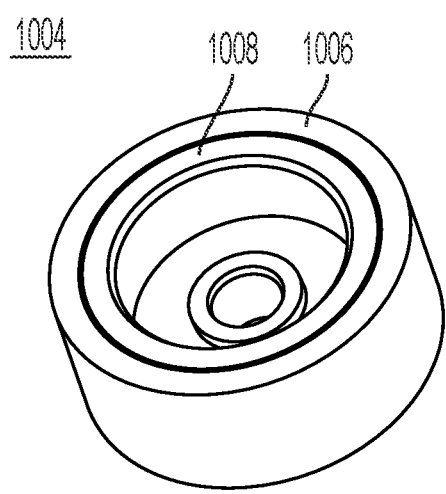
FIG. 40 depicts a partial perspective view of a rotor including a rotor core and a magnet ring mounted around the rotor core.
Figure 41:
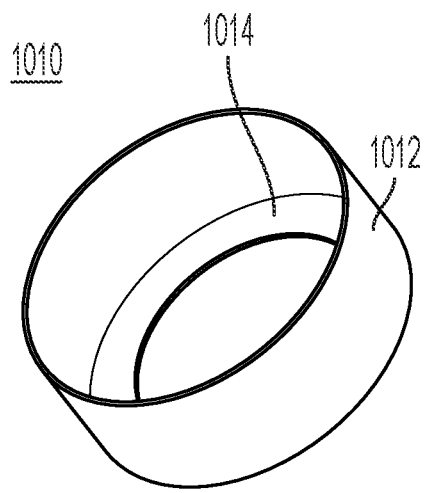
FIG. 41 depicts a perspective view of a sleeve provided for retention of the magnet ring on the rotor core, according to an embodiment.
Figure 42:
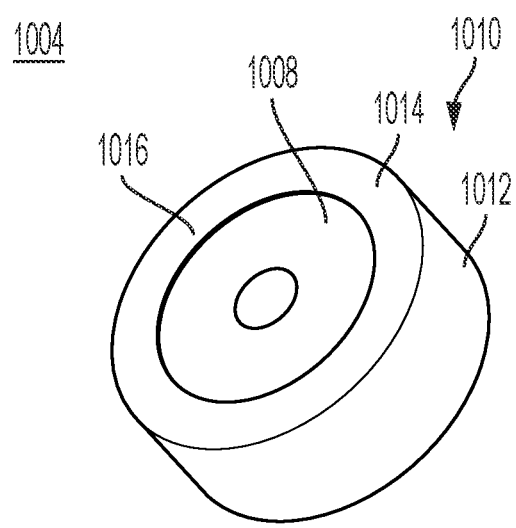
FIG. 42 depicts a perspective view of the rotor with the sleeve mounted, according to an embodiment.

FIG. 40 depicts a partial perspective view of a rotor 1004 including a rotor core 1008 and a magnet ring 1006 mounted around the rotor core 1008. These components are described previously in detail. FIG. 41 depicts a perspective view of a sleeve 1010 provided for retention of the magnet ring 1006 on the rotor core 1008, according to an embodiment. FIG. 42 depicts a perspective view of the rotor 1004 with the sleeve 1010 mounted, according to an embodiment. The sleeve 1010 is described here in detail.

In an embodiment, the sleeve 1010 is made of stamped steel having a thickness of approximately 0.1 to 0.5 mm, preferably approximately 0.2 to 0.3 mm. The sleeve 1010 includes a cylindrical body 1012 having a diameter sized to form-fittingly receive the outer surface of the magnet ring 1006. The high level of friction resulting from close-fitting contact between the cylindrical body 1012 and the magnet ring 1006 substantially secures the sleeve 1010 to the magnet ring 1006 in the rotational and/or axial direction. In an embodiment, the sleeve 1010 may be press-fitted on the magnet ring 1006, providing a fixed connection between the sleeve 1010 and the magnet ring 1006. Alternatively, a layer of adhesive may be applied between the cylindrical body 1012 of the sleeve 1010 and the magnet ring 1006.

In an embodiment, disposed at one end of the cylindrical body 1012 is an inwardly-projecting flange 1014 having a radial width that approximately equals to or is greater than the thickness of the magnet ring 1006 and thus substantially covers one end surface of the magnet ring 1006. In an embodiment, an inner edge 1016 of the flange 1014 comes into contact with the rotor core 1008. In an embodiment the inner edge 1016 of the flange 1014 is secured to the rotor core 1008 via, e.g., laser welding, soldering, or other known metal fusion technique. This arrangement allows transfer of rotational torque from the magnet ring 1006 to the rotor core 1008 via the sleeve 1010. In an embodiment, the sleeve 1010 may be provided in addition to, or as an alternative to, an adhesive between the magnet ring 1006 and the rotor core 1008 described above. In an embodiment, no adhesive is provided between the magnet ring 1006 and the rotor core 1008. Rather, the press-fit or friction-fit connection between the sleeve 1010 and the magnet ring 1006, and the metal fusion connection between the sleeve 1010 and the rotor core 1008, are relied on to secure the magnet ring 1006 to the rotor core 1008.

Figure 43:
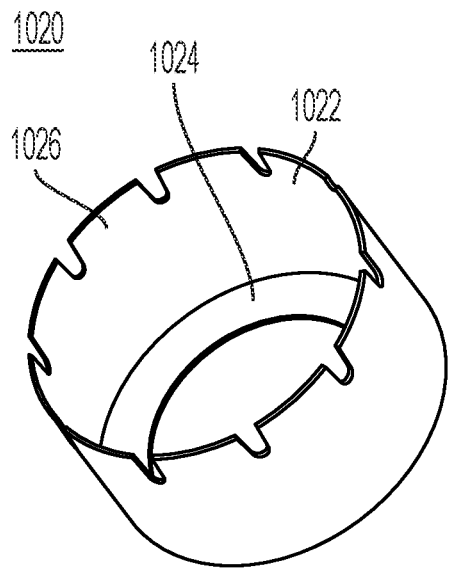
FIG. 43 depicts a perspective view of a sleeve, according to an alternative embodiment.

FIG. 43 depicts a perspective view of a sleeve 1020, according to an alternative embodiment. In this embodiment, sleeve 1020 is similar to sleeve 1010 described above in terms of material, thickness, and size. Sleeve 1020 includes a cylindrical body 1022 having a diameter sized to form-fittingly receive the outer surface of the magnet ring 1006, and an inwardly-projecting flange 1024 having a radial width that approximately equals to or is greater than the thickness of the magnet ring 1006 and thus substantially covers one end surface of the magnet ring 1006. The tight fit between the sleeve 1020 and the magnet ring 1006 ensures transfer of rotational torque between the two components. In addition, in an embodiment, an end of the sleeve 1020 opposite the flange 1024 includes a series of teeth 1026 that extend axially away from the cylindrical body 1022 in the axial direction.

Figure 44:
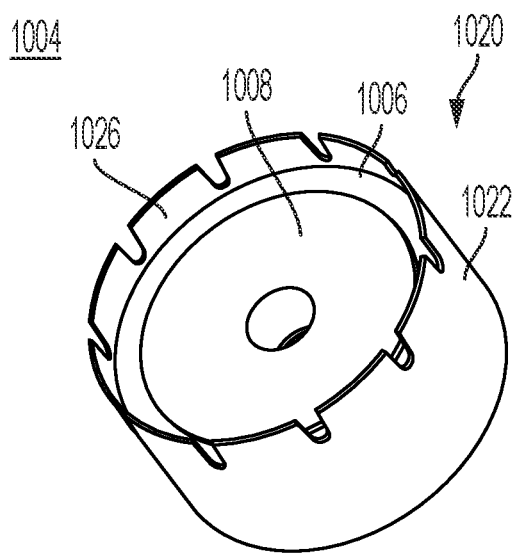
FIGS. 44 and 45 depict perspective views of the rotor with the sleeve mounted in unsecured and secured positions respectively, according to an embodiment.
Figure 45:
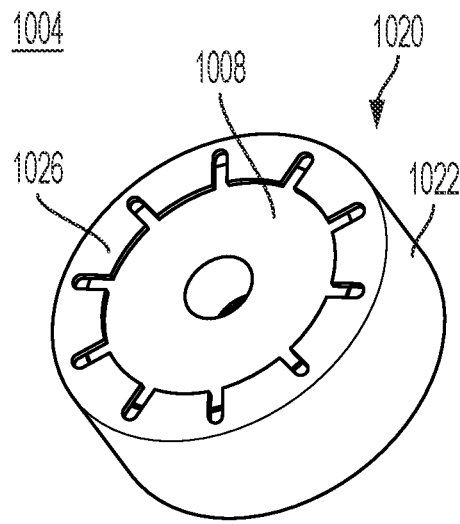

FIGS. 44 and 45 depict perspective views of the rotor 1004 with the sleeve 1020 mounted, according to an embodiment. After the magnet ring 1006 and the rotor core 1008 are received within the sleeve 1020, the teeth 1026 may be folded radially inwardly at a 90 degree angle to engage the corresponding end surface of the magnet ring 1006. The sleeve 1020 thus axially retains the magnet ring 1006 relative to the rotor core 1008 on both ends. In an embodiment, the teeth 1026 may be secured to the rotor core 1008 via, e.g., laser welding, soldering, or other known metal fusion technique.

Figure 46:
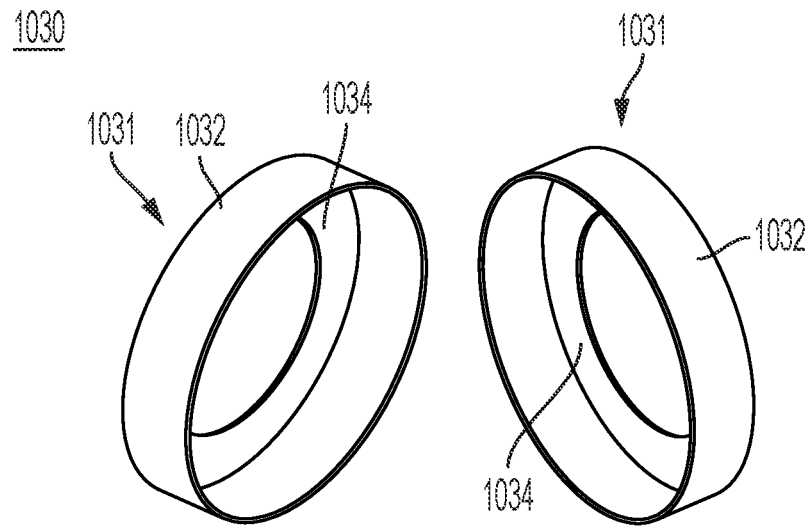
FIG. 46 depicts a perspective view of a sleeve assembly, according to an alternative embodiment.
Figure 47:
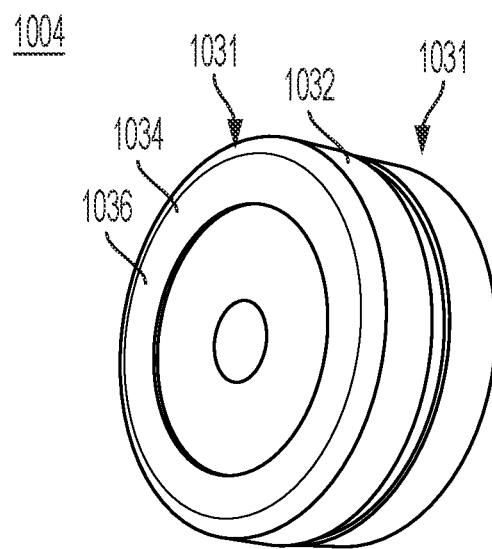
FIG. 47 depicts a perspective view of the rotor including the sleeve assembly.

FIG. 46 depicts a perspective view of a sleeve assembly 1030, according to yet another embodiment. FIG. 47 depicts a perspective view of the rotor 1004 including the sleeve assembly 1030.

In this embodiment, sleeve assembly 1030 includes two sleeves 1031 arranged to be received on two ends of the magnet ring 1006. Each sleeve 1031 is similar to sleeve 1010 described above, each including a cylindrical body 1032 and a flange 1034. However, a length of the cylindrical body 1032 is less than half the length of the magnet ring 1006. This allows the two sleeves 1031 to be mounted with flanges 1034 engaging the opposite ends of the magnet ring 1006. In an embodiment, inner edges 1036 of the flanges 1014 of the sleeves 1031 come into contact with opposite ends of the rotor core 1008. In an embodiment the inner edges 1036 of the flanges 1034 are secured to the two sides of the rotor core 1008 via, e.g., laser welding, soldering, or other known metal fusion technique. This arrangement allows transfer of rotational torque from the magnet ring 1006 to the rotor core 1008 via the sleeve 1030.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A brushless direct-current (BLDC) motor comprising:
a stator including a stator core, a plurality of teeth, and a plurality of windings;
a rotor shaft disposed within the stator and extending along a longitudinal axis; and
a rotor comprising a rotor core having a radial wall including a center opening that receives the rotor shaft therein and a cylindrical body extending from the radial wall and forming an annular recess therein around the rotor shaft adjacent the radial wall, wherein a bearing mounted on the rotor shaft is nested within the annular recess of the rotor core,
wherein the rotor further comprises a permanent magnet ring mounted on an outer surface of the cylindrical body with no intermediate adhesive therebetween, and a metal sleeve securely fitted outside the permanent magnet ring, the metal sleeve including a flange extending radially inwardly that covers an axial end of the permanent magnet ring and is bonded to an end surface of the cylindrical body of the rotor core opposite the radial wall to secure the permanent magnet ring to the rotor core such that a rotational torque of the rotor is transmitted to the permanent magnet ring substantially through the metal sleeve, wherein the flange has a radial width that is greater than or equal to a thickness of the permanent magnet ring but does not reach the annular recess.

2. The BLDC motor of claim 1, wherein the flange is bonded to the rotor core via welding or soldering.

3. The BLDC motor of claim 1, wherein the metal sleeve is press-fitted or friction-fitted on the permanent magnet ring.

4. The BLDC motor of claim 1, wherein the metal sleeve is mounted on a first end of the rotor core, further comprising a second metal sleeve mounted on a second end of the rotor core opposite the metal sleeve.

5. The BLDC motor of claim 4, wherein a length of the metal sleeve is less than half a length of the permanent magnet ring, and a length of the second metal sleeve is less than half the length of the permanent magnet ring.

6. The BLDC motor of claim 1, wherein the sleeve further includes a plurality of teeth located opposite the flange and folded radially inwardly to engage a second axial end of the permanent magnet ring.

7. The BLDC motor of claim 6, wherein the plurality of teeth is bonded to the rotor core via welding or soldering.

8. A power tool comprising:
- a housing;
- a trigger switch mounted on the housing;
- a battery receptacle located on the housing and configured to receive a removeable battery pack; and
- the BLDC motor of claim 1 disposed within the housing and configured to receive power from the battery pack.

\* \* \* \* \*